US012536092B1

(12) United States Patent
Bertsch

(10) Patent No.: US 12,536,092 B1
(45) Date of Patent: Jan. 27, 2026

(54) SERVICE LEVEL OBJECTIVE (SLO) BASED CONTINUOUS INTEGRATION / CONTINUOUS DEVELOPMENT (CICD) FRAMEWORK FOR PERFORMANCE TESTING

(71) Applicant: United Services Automobile Association (USAA), San Antonio, TX (US)

(72) Inventor: Mitchell Cory Bertsch, La Grange, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 211 days.

(21) Appl. No.: 18/367,959

(22) Filed: Sep. 13, 2023

Related U.S. Application Data

(60) Provisional application No. 63/406,027, filed on Sep. 13, 2022.

(51) Int. Cl.
*G06F 11/3604* (2025.01)
(52) U.S. Cl.
CPC ................ *G06F 11/3604* (2013.01)
(58) Field of Classification Search
None
See application file for complete search history.

(56) References Cited

U.S. PATENT DOCUMENTS

| | | | | |
|---|---|---|---|---|
| 9,921,866 | B2* | 3/2018 | Ganguli | G06F 9/5072 |
| 11,223,552 | B1* | 1/2022 | Anderson | G06F 16/285 |
| 2007/0294672 | A1* | 12/2007 | Mosuoka | G06Q 10/06 |
| | | | | 717/126 |
| 2023/0396518 | A1* | 12/2023 | Strassner | H04L 41/5048 |

OTHER PUBLICATIONS

James Brady, "Load Testing Virtualized Servers Issues and Guidelines", 2007, CMG Journal Fall (Year: 2007).*

* cited by examiner

*Primary Examiner* — Lewis A Bullock, Jr.
*Assistant Examiner* — Mark A Gooray
(74) *Attorney, Agent, or Firm* — Fletcher Yoder, PC

(57) ABSTRACT

A Service Level Objective (SLO)-based Continuous Integration/Continuous Development (CICD) framework is disclosed, which enables SLO-based Canary deployments, SLO-based chaos engineering, and/or SLO-based performance testing. The SLO-based CICD framework enhances and simplifies CICD pipelines and brings the pipelines in line with Site Reliability Engineering (SRE) best practices. By relying on SLOs rather than SLIs, the SLO-based CICD framework avoids the use of threshold-based alerts, which can be noisy and error prone, and the thresholds associated with threshold-based alerts can change over time due to changes in production volume. The SLO-based CICD framework uses multi-window burn rates when evaluating SLOs, which removes the reliance on a static, predefined thresholds of SLI threshold-based alerting, and removes sensitivity of such evaluations to changes in production volume.

15 Claims, 16 Drawing Sheets

CICD API     52

ENDPOINTS     54

/slo /cicd /services /{serviceID} /deploy-plan
CALCULATES LIST OF STEP DELAYS AND STEP PERCENTAGES
FOR USE IN THE CANARY DEPLOYMENT     54A

/slo /cicd /services /{serviceID} /burn-rates
EVALUATES THE CURRENT MULTI-WINDOW BURN RATES BASED
ON THE CANARY DEPLOYMENT GIVEN THE ROUTE PERCENTAGE,
SECONDS SINCE ROUTING BEGAN, AND A LIST OF SLOs WITH
OPTIONAL FILTERS     54B

/slo /cicd /services /{serviceID} /chaos-budgets
PERFORMS DYNAMIC CALCULATION OF CHAOS BUDGET AVAILABLE
FOR EXPERIMENTATION BASED ON CURRENT ERROR BUDGET,
VOLUME, AND FAILURE RATES     54C

/slo /cicd /services /{serviceID} /peak-volumes     54D
DETERMINES THE PEAK VOLUMES OF TRAFFIC IN PRODUCTION
ALONG WITH RETURNING THE SLO CONFIGURATION, SUCH AS
LATENCY BUCKETS AND TARGETS FOR USE IN PERFORMANCE TESTS

FIG. 2

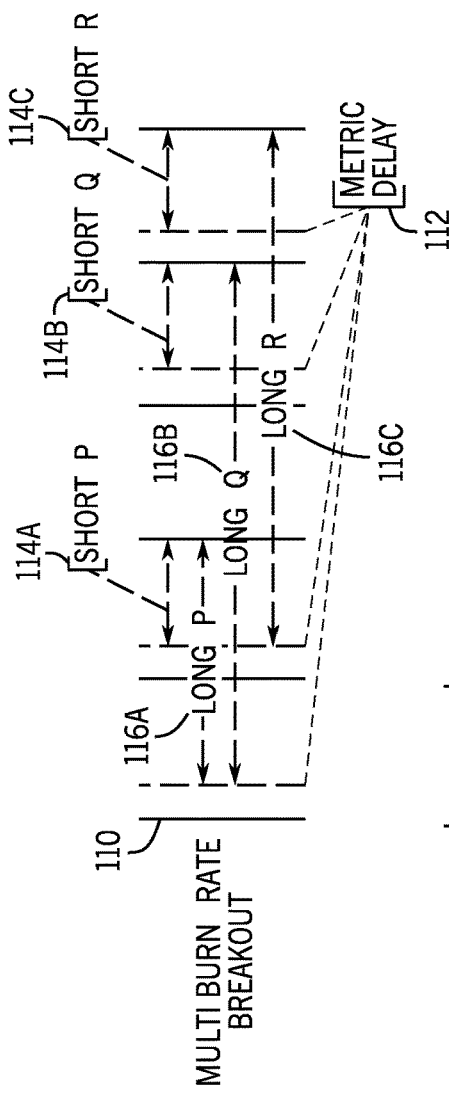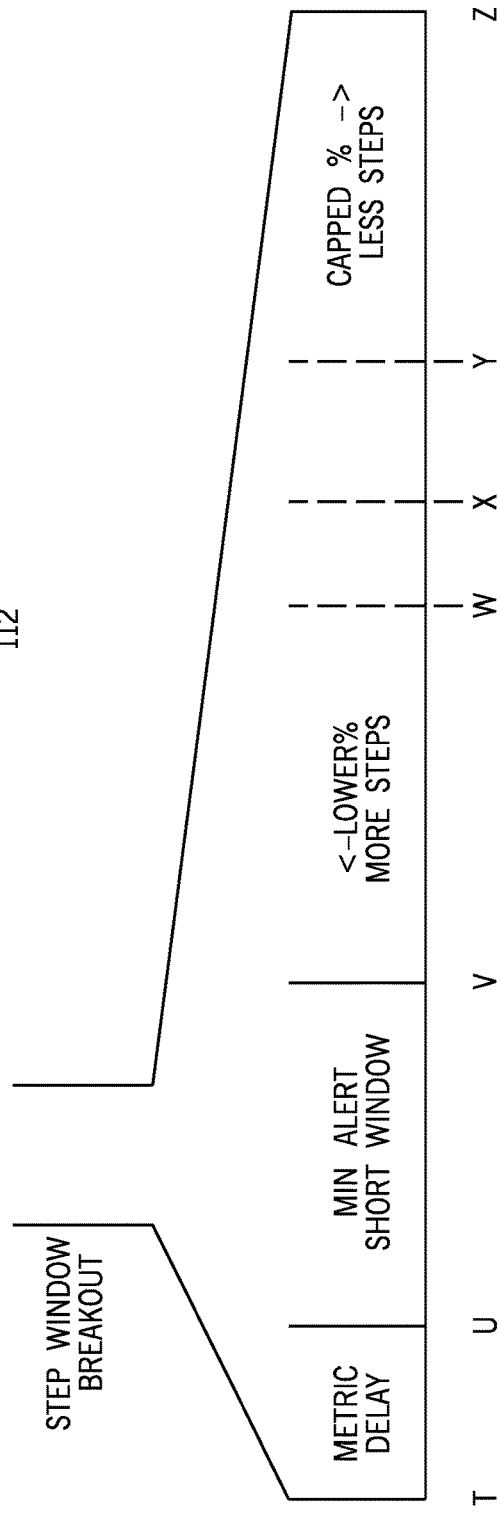
FIG. 4A
FIG. 4B

SERVICE LEVEL OBJECTIVE (SLO) BASED CONTINUOUS INTEGRATION / CONTINUOUS DEVELOPMENT (CICD) FRAMEWORK FOR PERFORMANCE TESTING

CROSS-REFERENCE TO RELATED APPLICATIONS

This application claims priority to and the benefit of U.S. Provisional Application No. 63/406,027, entitled "Service Level Objective (SLO) based Continuous Integration/Continuous Development (CICD) Framework," filed on Sep. 13, 2022, which is incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In software engineering, one methodology for the development and deployment of software is continuous integration/continuous development (CICD), which may alternatively be referred to as continuous integration/continuous delivery or continuous integration/continuous deployment. In general, the continuous integration portion relates to integrating code changes into a main branch, in which the application is regularly built, tested, and merged into a shared source code repository. As such, continuous integration enables coding errors and security issues to be identified and corrected earlier in the software development lifecycle. In general, the continuous development portion, also sometimes referred to as "continuous delivery", relates to the development or modification of applications in short, high-frequency cycles and to the automation of resource provisioning and application deployment. Benefits of the CICD methodology include reduced software errors and bugs, enhanced predictability and reliability, faster delivery of new features and bug fixes, and reduced developer time and effort.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a computing system includes at least one memory configured to store a Service Level Objective (SLO)-based Continuous Integration/Continuous Development (CICD) framework having a CICD application programming interface (API) and at least one processor configured to execute stored instructions to cause the SLO-based CICD framework to perform actions. The actions include receiving inputs comprising a set of performance test variables, wherein each performance test variable of the set of performance test variables comprises a respective set of associated SLOs. The actions include, for each performance test variable of the set of the performance test variables: executing an endpoint of the CICD API to determine performance testing configurations for the respective set of associated SLOs of the performance test variable, including a respective peak traffic volume for each SLO of the respective set of associated SLOs, and updating the performance testing configurations of the respective set of associated SLOs of the performance test variable based on one or more parameters of the performance test variable. The actions include performing performance testing of an application using the set of the performance test variables, and returning results of the performance testing.

In an embodiment, a method of operating a Service Level Objective (SLO)-based Continuous Integration/Continuous Development (CICD) framework having a CICD application programming interface (API) is disclosed. The method includes receiving inputs comprising a set of performance test variables, wherein each performance test variable of the set of performance test variables comprises a respective set of associated SLOs. The method includes, for each performance test variable of the set of the performance test variables: executing an endpoint of the CICD API to determine performance testing configurations for the respective set of associated SLOs of the performance test variable, including a respective peak traffic volume for each SLO of the respective set of associated SLOs, and updating the performance testing configurations of the respective set of associated SLOs of the performance test variable based on one or more parameters of the performance test variable. The method includes performing performance testing of an application using the set of the performance test variables, and returning results of the performance testing.

In an embodiment, a non-transitory, computer-readable medium stores instructions executable by a processor of a computing system to provide a Service Level Objective (SLO)-based Continuous Integration/Continuous Development (CICD) framework having a CICD application programming interface (API). The instructions include instructions to receive inputs comprising a set of performance test variables, wherein each performance test variable of the set of performance test variables comprises a respective set of associated SLOs. The instructions include instructions to, for each performance test variable of the set of the performance test variables: execute an endpoint of the CICD API to determine performance testing configurations for the respective set of associated SLOs of the performance test variable, including a respective peak traffic volume for each SLO of the respective set of associated SLOs, and update the performance testing configurations of the respective set of associated SLOs of the performance test variable based on one or more parameters of the performance test variable. The instructions include instructions to perform performance testing of an application using the set of the performance test variables, and return results of the performance testing.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 2 is a schematic diagram illustrating an embodiment of a CICD application programming interface (API) of the CICD framework that includes a number of example endpoints, in accordance embodiments of the present technique;

FIG. 4A is a schematic diagram illustrating an example of how burn rates are determined in a multi-window manner by the SLO-based CICD framework, in accordance embodiments of the present technique;

FIG. 4B is a schematic diagram illustrating an example of the factors that contribute to calculating the duration of a step window, in accordance embodiments of the present technique;

DETAILED DESCRIPTION

Figure 1:
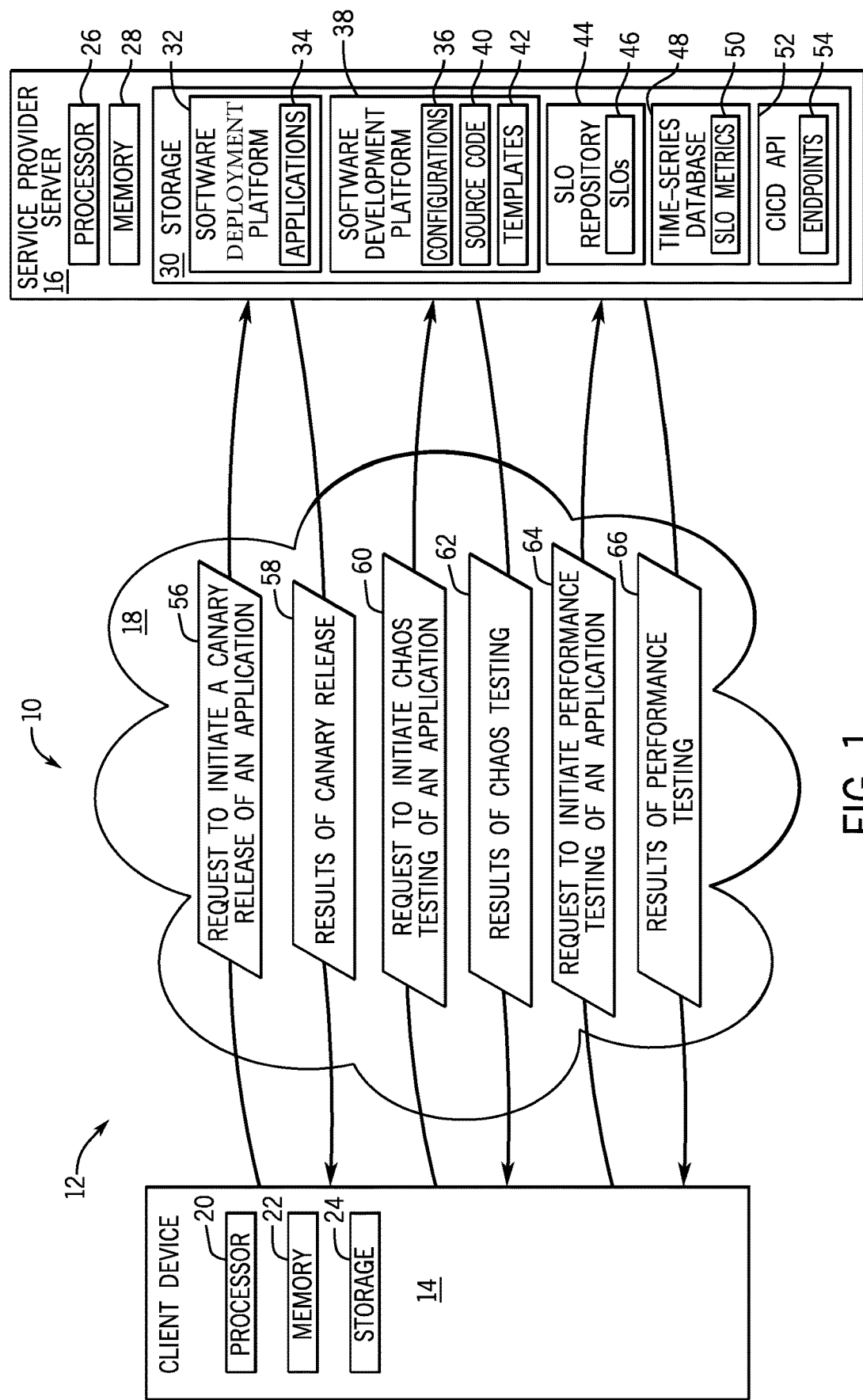
FIG. 1 is a schematic diagram of an example Service Level Objective (SLO)-based Continuous Integration/Continuous Development (CICD) framework deployed in a client-server architecture, in accordance embodiments of the present technique.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

A Service Level Indicator (SLI) defines a target value (or range of values) for a specific application or service. As such, SLIs are measurements used to determine SLO compliance. Examples of SLIs include: Hypertext Transfer Protocol (HTTP) status codes, response times, memory usage, processor usage, and so forth. As such, SLIs are typically monitored using threshold-based alerts, which fire in response to a SLI meeting or exceeding a predefined threshold value (e.g., memory usage exceeding a predefined limit or bound), and using caused-based alerts, which fire in response to a particular condition being met within the SLIs (e.g., a particular HTTP status code being generated).

However, it is presently recognized that threshold and cause-based alerts can be noisy and can add undesired complexity. For threshold-based alerting, false positives are common and tribal knowledge of developers is relied upon to determine whether an alert represents an actual issue to be addressed. For example, a threshold-based alert may be triggered by a SLI meeting or exceeding a predefined threshold, even if the SLI has already recovered from a transient event (e.g., a failover event). Additionally, threshold-based alerting struggles to handle changes in production volume, as a dramatic increase or decrease in production volume may render a predefined threshold value incorrect or ineffective. As such, threshold-based alerting often involves updating the predefined threshold values over time to accommodate changes in production volume. For cause-based alerting, many one-off alerts are often generated that are never fired again, and, therefore, do not represent an actual issue to be addressed. As causes can change over time, cause-based alerting typically requires developers to develop and maintain a vast number of alerts that can be triggered. Furthermore, for cause-based alerting, when a developer fails to create an alert to be triggered in response to a given cause (e.g., an unconsidered cause), then issue may go unmonitored and unnoticed by the developers. As such, it is presently recognized that threshold-based and caused-based alerting for SLIs increases developer efforts and can undesirably draw developers away from other efforts (e.g., feature work) while attempting to diagnose and resolve false-positive that do not represent an actual issue to be addressed.

In contrast, a Service Level Objective (SLO) defines a target for the quality of service for a specific application or service. For example, SLOs may generally define when developer efforts should be shifted between reliability work and feature work. As such, unlike SLIs, SLOs more broadly focus on the customer experience by monitoring the symptoms rather than the underlying causes for issues related to the application or service. An example SLO may define that the availability of an application or service should be greater than or equal to 99% over one or more time windows (e.g., a day, a 30-day window, a 90 day window) to meet the requirements of a corresponding service-level agreement (SLA). Similarly, SLOs can be defined for maintaining a latency of an application or service below a predefined threshold, for maintaining a response time of an application or service above a predefined threshold, for maintaining computing resource (e.g., processor, memory, storage) usage below a predefined threshold, and so forth. It may be appreciated that, for such SLOs, all time windows are considered, including maintenance windows, as this more accurately captures the actual customer experience with respect to the availability of the application. As used herein, the term "error budget" refers to the difference between a current value of an SLO and a minimal or maximum acceptable value that the SLO can reach before the SLO is breached. For instance, for the example availability SLO mentioned above, presuming that the application or service was available for a time window, then the error budget would be 1%, meaning that the application or service could "afford to be" unavailable for 1% of the remaining time window before the SLO would be breached. As used herein, the term "burn rate" refers to the rate of consumption of the error budget of an SLO for an application or service over a particular time window.

With the foregoing in mind, the present disclosure relates generally to a Service Level Objective (SLO)-based Continuous Integration/Continuous Development (CICD) framework, which may alternatively be referred to as a continuous integration/continuous delivery framework or a continuous integration/continuous deployment framework, that enables SLO-based Canary deployments, SLO-based chaos engineering, and/or SLO-based performance testing.

The SLO-based CICD framework enhances and simplifies CICD pipelines and brings the pipelines in line with Site Reliability Engineering (SRE) best practices. The SLO-based CICD framework increases feature delivery rates, improves reliability of production systems, improves member/customer happiness and the service provider's reputation, reduces the overall cost associated with information technology (IT) systems, and gives the business better insight into IT releases. By relying on SLOs rather than SLIs, the SLO-based CICD framework avoids the use of threshold-based alerts, which can be noisy and error prone, and the thresholds associated with threshold-based alerts can change over time due to changes in production volume. By relying on SLOs rather than SLIs, the SLO-based CICD framework also avoids the use of caused-based alerts, which are also noisy and can have unconsidered causes, since it is difficult or impossible to maintain a list of all possible error conditions. Furthermore, by relying on SLOs rather than SLIs, the SLO-based CICD framework is not dependent on the level of tribal knowledge that is typically required for SLI-based frameworks that rely on threshold or cause-based alerts. Additionally, the SLO-based CICD framework uses multi-window burn rates when evaluating SLOs, which removes the reliance on a static, predefined thresholds of SLI threshold-based alerting, and removes sensitivity of such evaluations to changes in production volume. By evaluating the SLOs over multiple burn rate windows, the SLO-based CICD framework also removes sensitivity to blips or spikes in an SLO, wherein the each burn rate extrapolates the time when a SLO will be breached and relates an outage to business terms.

With respect to SLO-based Canary deployments, the SLO-based CICD framework reduces IT costs and developer efforts by avoiding the manual toil generally associated with Canary deployments. This includes removing requirements for developers to continually monitor dashboards and to manually provide inputs (e.g., button selections) to initiate rollout. In case of issues during a Canary deployment, the SLO-based CICD framework supports auto-rollback. The SLO-based CICD framework offers a generic implementation that applies to most applications or services without requiring custom modifications. The SLO-based CICD framework also enables Canary deployments by service providers for environments (e.g., banking environments) for which legal or regulatory compliance issues prevent the use of production test members to validate production releases automatically. To effectively manage risk levels, the SLO-based CICD framework enables applications or services to be blocked from release or deployment when an error budget for the application or service has been breached.

With respect to SLO-based chaos engineering, it is presently recognized that existing chaos-controlled injection (CCI) solutions rely on SLIs and do not monitor the SLOs that are affected during chaos testing. This can cause undesirable excessive impact as uncontrolled static targets can lead to excessive failures. For CCI in the SLO-based CICD framework, dynamic calculation of the fault injection tolerance is determined based, at least in part, on the current non-chaos failures and a SLO-based burn rate upper bound. It may be appreciated that this enables controlled chaos testing of production failure cases to enhance resiliency without exceeding the allowed error budget, ensuring SLO compliance and client satisfaction. The SLO-based CICD framework also varies chaos fault injection based on current volume to ensure that the application or service being tested will be able to handle changes in volumes over time.

With respect to SLO-based performance testing, it is presently recognized that existing performance testing solutions do not determine SLO volumes to keep performance tests updated with respect to the current production volumes, which can result in outdated targets. For SLO-based performance testing in the SLO-based CICD framework, SLO targets and SLI definitions are retrieved, and the performance tests are updated by the CICD application programming interface (API) based on the business definitions. As such, this SLO-based performance testing enables issues in applications or services to be identified and corrected before being deployed into a production environment.

With the foregoing in mind, FIG. 1 is schematic diagram of an embodiment of the SLO-based CICD framework 10 deployed in a client-server architecture 12, wherein the SLO-based CICD framework 10 enables SLO-based Canary deployments, SLO-based chaos engineering, and/or SLO-based performance testing. The client-server architecture 12 includes at least one client device 14 that is communicatively coupled to at least one service provider server 16 (also referred to herein as simply "server") via a suitable network 18. For purposes of simplicity, "server 16" is referred to in certain instances of the disclosure below, although it should be understood that "server" as used herein may be descriptive of one server or multiple servers. In certain embodiments, the client device 14 may be a desktop computer, a laptop computer, a smart phone, or another suitable computing device. In certain embodiments, the server 16 may be a server disposed within a data center or disposed at a location of the service provider. The network 18 may include a wide-area network (WAN), a local-area network (LAN), a virtual private network (VPN), the internet, another suitable wired and/or wireless network, or any suitable combination thereof.

For the illustrated embodiment, the client device 14 includes at least one processor 20 (e.g., a central processing unit (CPU), a graphic processing unit (GPU)), at least one memory 22 (e.g., random access memory (RAM), read-only memory (ROM)), and at least one storage 24 (e.g., a hard disk drive (HDD), a solid-state disk (SSD), flash memory). In certain embodiments, the client device 14 may be a smart phone device. The storage 24 of the client device 14 may store any suitable number of applications or apps that are executed by the processor 20 to provide desired functionality at the client device 14. For example, the storage 24 of the client device 14 may store a client web browser that can be loaded into memory 22 and executed by the processor 20 to enable the client device 14 to interact with websites, including websites hosted by the server 16. In some embodiments, the storage 24 of the client device 14 may store an application (e.g., an app) that can be loaded into memory 22 and executed by the processor 20 to enable the client device 14 to interact with the services hosted by the server 16.

For the embodiment of the SLO-based CICD framework 10 illustrated in FIG. 1, the server 16 includes at least one processor 26 (e.g., a CPU, a GPU), at least one memory 28 (e.g., RAM, ROM), and at least one storage 30 (e.g., a HDD, a SSD, flash memory). The storage 30 includes a number of elements that may be loaded into the memory 28 and executed by the processor 26 to enable different functionality. For the illustrated embodiment, the storage 30 of the server 16 includes a software deployment platform 32 that hosts a number of deployed applications 34, as well as respective configurations 36 for each of the deployed applications. For example, the software deployment platform 32 may include OPENSHIFT (available from RED HAT), Kubernetes, or another suitable software deployment platform 32. The deployed applications 34 may include, but are not limited to, web serving applications, user interface applications, cloud-based applications, banking applications, e-commerce applications, account management applications, and so forth, which are executed by the processor 26 to provide desired functionality to the client via the client device 14. For example, in an embodiment, the deployed applications 34 may include a banking application that is executed by the processor 26 of the server 16 to enable a user of the client device 14 to access their banking information, transfer funds between accounts, apply for lending opportunities, and so forth.

For the embodiment of the SLO-based CICD framework 10 illustrated in FIG. 1, the storage 30 of the server 16 includes a software development platform 38, such as GIT-LAB (available from GITLAB, Inc.) or another suitable software development platform 38. The software development platform 38 stores source code 40 for the deployed applications 34, the source code 40 for different versions (e.g., older versions, newer versions) of the deployed applications 34, and the source code 40 for new applications under development. As used herein, "source code" may refer to instructions (e.g., human-readable instructions, machine-readable instructions, or both) for compiled programming languages, interpreted or scripted programming languages, or any combination thereof. The software development platform 38 also includes templates 42 (e.g., pipeline templates) storing executable control flows for each of the applications 34. For example, in certain embodiments, the templates 42 may include a respective Canary deployment template, chaos testing template, and/or performance testing template for each of the applications 34. It should be noted that, in certain embodiments, the software development platform 38 may host, store, or otherwise include the configurations 36 referenced above with respect to the software deployment platform 32.

For the embodiment of the SLO-based CICD framework 10 illustrated in FIG. 1, the storage 30 of the server 16 includes a SLO repository 44 that stores a number of SLOs 46, as well as a time-series database 48 storing SLO metrics 50 indicating the historical operation of the deployed applications 34 hosted by the software deployment platform 32. The SLO metrics 50 may include any action, status, or state of the deployed applications during operation. For example, the SLO metrics 50 may indicate times at which requests were received by an application, times at which responses to these requests were provided by the application, errors encountered during execution of the application, times at which the application is down or unavailable, computing resource (e.g., memory, processing, storage) usage of the application over time, and so forth. In certain embodiments, the SLOs 46 may include respective SLOs for each of the deployed applications 34 hosted by the software deployment platform 32. Each of the SLOs 46 includes a query that, when executed against the SLO metrics 50 of the time-series database 48, return values indicating the historical performance of each of the deployed applications 34 over a predefined time window (e.g., 30-days) with respect to a particular aspect of operation (e.g., latency, response times, availability) of each of the applications. Additionally, each of the SLOs 46 defines threshold values (e.g., maximum acceptable latency, maximum acceptable response times, maximum acceptable availability, maximum acceptable memory usage, maximum acceptable processor usage) for each of the deployed applications 34 in order to comply with a service-level agreement (SLA) between the service provider and the client.

For the embodiment of the SLO-based CICD framework 10 illustrated in FIG. 1, the storage 30 of the server 16 includes a CICD application programming interface (API) 52 that enables SLO-based Canary deployments, SLO-based chaos engineering, and/or SLO-based performance testing of the applications 34 hosted by the server 16. As discussed in greater detail below, the CICD API 52 includes a number of endpoints 54, wherein each of the endpoints 54 enables a different function within the SLO-based CICD framework 10. For example, the endpoints 54 may include respective endpoints 54 designed to determine deployment plans, burn rates, chaos budgets, and peak volumes for a particular application. In certain embodiments, the endpoints 54 may be executed directly in response to a call or request from a user of the client device 14, while in some embodiments, the endpoints 54 may instead be executed in response to calls provided by the templates 42 of the software development platform 38, or another suitable element of the SLO-based CICD framework 10.

For example, in response to receiving a request 56 to initiate a Canary deployment of an application, the software development platform 38 may execute a Canary deployment template associated with the application to perform the Canary deployment, wherein the template calls one or more of endpoints 54 of the CICD API 52 to determine a deployment plan and to monitor burn rates to ensure that relevant SLOs 46 are not breached during the Canary deployment. In some embodiments, the server 16 may respond by providing results 58 of the Canary deployment to the client device 14. In another example, in response to receiving a request 60 to perform chaos testing of an application, the software development platform 38 may execute a chaos testing template associated with the application to perform the chaos testing, wherein the template calls one or more of the endpoints 54 of the CICD API 52 to monitor the available chaos budget to ensure that relevant SLOs 46 are not breached during the chaos testing. In some embodiments, the server 16 may respond by providing results 62 of the chaos testing to the client device 14. In another example, in response to receiving a request 64 to perform performance testing of an application, the software development platform 38 may execute a performance testing template associated with the application to perform the performance testing, wherein the template may call one or more of the endpoints 54 of the CICD API 52 to determine peak production traffic volumes and information related to the SLOs 46 to ensure that the performance testing complies with the SLOs 46 at peak production traffic volumes. In some embodiments, the server 16 may respond by providing results 66 of the performance testing to the client device 14.

FIG. 2 is a schematic diagram illustrating an embodiment of the CICD API 52 that includes a number of example endpoints 54. For the embodiment of the CICD API 52 illustrated in FIG. 2, each of the endpoints 54 has a corresponding universal resource identifier (URI), which defines a path or location that is used to call each of the endpoints. It may be appreciated that the beginning of the URI ("/slo/cicd/services/") may be different in different implementations. Additionally, the "{serviceID}" notation refers to a unique identifier for the application or service to be acted upon by the endpoint. As such, each of the endpoints 54 illustrated in FIG. 2 may be respectively implemented for each of the applications associated with the software development platform 38 and/or the software deployment platform 32 of the SLO-based CICD framework 10. In certain embodiments, one or more of the endpoints 54 may include additional URIs (e.g., secondary URIs) that can also be used to call the endpoints associated with a particular application or service. As discussed below, certain endpoints 54 may receive or access additional information (e.g., input parameters values) to perform their respective functions.

For the embodiment illustrated in FIG. 2, the endpoints 54 include a respective deploy-plan endpoint 54A, burn-rates endpoint 54B, chaos-budget endpoint 54C, and peak-volumes endpoint 54D for the applications 34 associated with the software development platform 38 and/or the software deployment platform 32 of the SLO-based CICD framework 10. The deploy-plan endpoint 54A is designed to calculate step delays and step percentages for use in a Canary deployment of an application or service. The burn-rates endpoint 54B is designed to receive at least a route percentage, seconds since routing began, and a set of SLOs with optional filters as inputs, and to evaluate the current multi-window burn rates based on the Canary deployment of an application. The chaos-budget endpoint 54C is designed to perform dynamic calculation of how much chaos budget is available for experimentation (e.g., chaos testing) based on a current error budget, a current volume, and current failure rates of an application or service. The peak-volumes endpoint 54D is designed to determine peak volumes of traffic in production and to return the SLO configuration (e.g., latency buckets, targets) for use in performance testing of an application or service. It may be appreciated that the endpoints 54 illustrated in FIG. 2 are merely provided as examples, and in other embodiments, a greater or lesser number of endpoints 54 may be defined, in accordance with the present disclosure.

SLO-Based Canary Deployments

Figure 3:
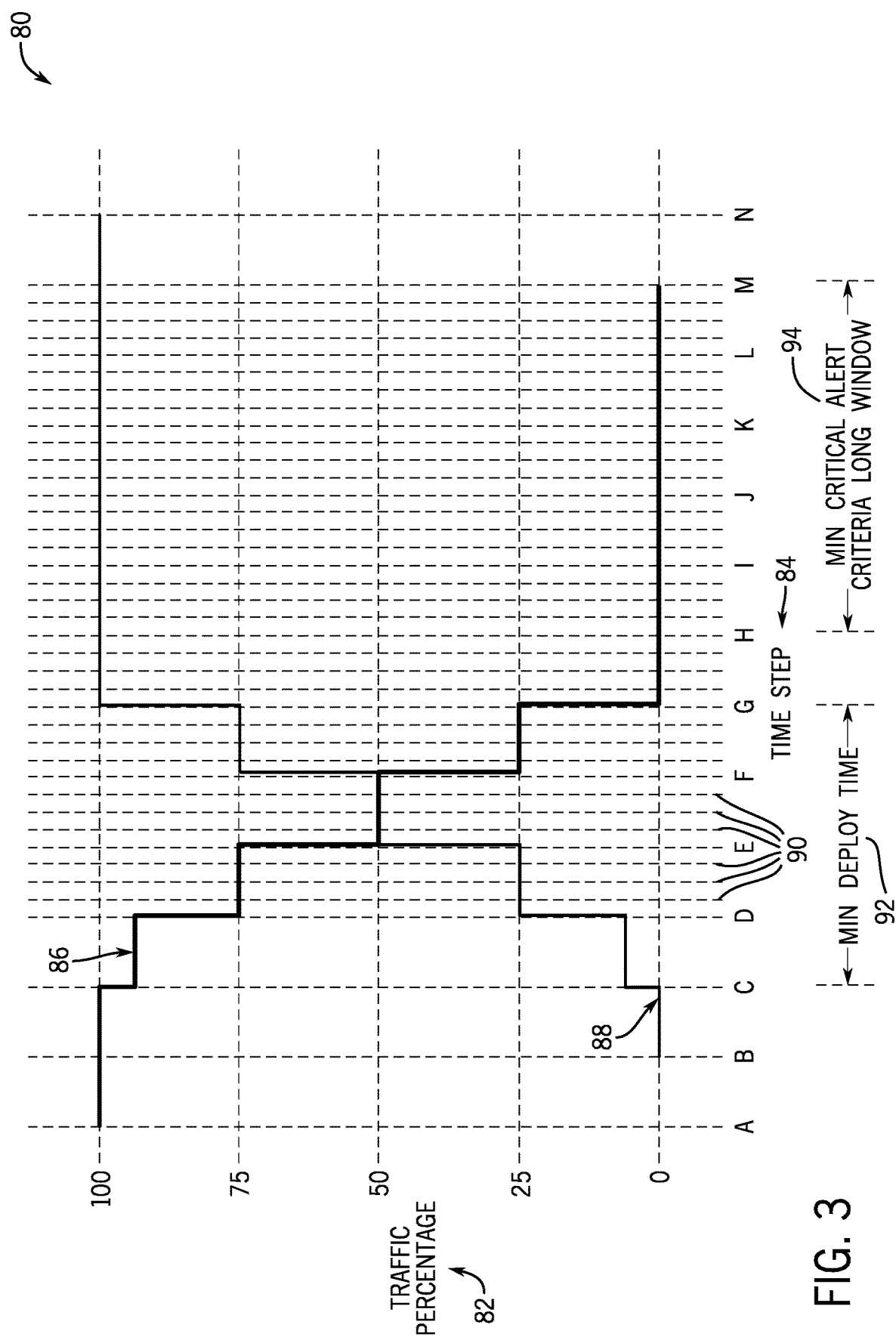
FIG. 3 is an example deployment traffic diagram for an example Canary deployment flow illustrating traffic percentage as a function of time steps, in accordance embodiments of the present technique.

FIG. 3 is an example deployment traffic diagram 80 for an example Canary deployment flow illustrating traffic percentage 82 as a function of time steps 84. Line 86 indicates the percentage of traffic volume being received by a previous release or version of an application that is being undeployed, while the line 88 indicates the percentage of traffic volume being received by a new release or version of the application that is being deployed, throughout the example Canary deployment process. Within the SLO-based CICD framework 10, the actions or steps performed as part of the Canary deployment flow depicted in FIG. 3 may be stored as executable instructions in at least one of the templates 42 of the software development platform 38 illustrated in FIG. 1. When executed by the processor 26 of the server 16, the template makes calls to the endpoints 54 of the CICD API 52 to calculate step delays and step percentages for the Canary deployment, as well as to monitor burn rates throughout the Canary deployment, as discussed below.

For the embodiment illustrated in FIG. 3, each of the time steps 84 is designated by a respective letter (e.g., time steps A-N), indicating a particular point in time during the Canary deployment process. While the illustrated time steps 84 are illustrated as evenly spaced for simplicity, it may be appreciated that the amount of time between certain of the time steps 84 may be different in certain embodiments. For the embodiment illustrated in FIG. 3, the time between time step A and time step B represents time before the actual deploy process begins, wherein the previous version of the application is the only deployed version and is receiving 100% of the traffic volume.

At time step B, the new version of the application is released. The duration between time step B and time step C represents an amount of time that passes before the new version of the application is ready to begin receiving traffic. At this point, or prior to this point, the executing template makes suitable calls to the deploy-plan endpoint 54A of the CICD API 52 to determine step delays (e.g., time between each of the time steps C-M) and step percentages (e.g., increases to percentage of traffic routed to the new version of the application at each routing decision at time steps C-G) for the Canary deployment, as discussed in greater detail below.

At time step C, the new version of the application is ready to receive traffic and the first routing action is made. For the illustrated example, the traffic volume for the application is high, and, as such, the percentage of the traffic routed to the new version of the application at time step C is low (e.g., <10%). More specifically, for the illustrated example, the initial percentage of traffic routed to the new version of the application may only be sufficient to meet a minimum traffic volume capable of generating an alert in order to "warm-up" the new version of the application. In other cases, when the traffic volume of the application is low, then the time step C may be omitted, and the percentage of the traffic routed to the new version of the application may increase directly to a higher percentage (e.g., 25%) at time step D. As such, the first routing action will correspond to a minimum percentage of traffic that meets the minimum volume threshold for a given alert between 1% and a predetermined capped percentage value (e.g., 25% when 4 routing actions are used). The remaining number of routing actions is determined based, at least in part, on the number of step windows, the minimum deployment time, and/or the maximum deployment time. For example, the percentage of the traffic routed to the new version of the application may be determined by subtracting the initial routing decision percentage from 100, and then dividing by the number of remaining routing actions.

For the embodiment illustrated in FIG. 3, at time step D, the executing template calls the burn-rates endpoint 54B to determine the current burn rate of the new version of the application with respect to the relevant SLOs and, based on the results, a second routing action is made. Since the new version of the application has not been released for sufficient time to be able to perform a multi-window burn rate analysis, the burn-rates endpoint 54B performs a single-window burn rate analysis using a short window to determine the current burn rate of the new version of the application with respect to the relevant SLOs. Both the time steps and the multi-burn rate analysis are discussed in greater detail below. When the burn rates remain below corresponding threshold values, the executing template may respond by performing a routing action to increase the percentage of the traffic routed to the new version of the application and away from the previous version of the application. For each routing action, the percentage of the traffic that is routed to the new version of the application (and away from the previous version of the application) is based on the deployment plan provided in response to the aforementioned call to the deploy-plan endpoint 54A of the CICD API 52.

For the embodiment illustrated in FIG. 3, following time step D, the dashed lines 90 between the remaining time steps each represent an additional, optional rollback decision point, for embodiments in which the SLO-based CICD framework 10 supports callbacks. That is, at each of these dashed lines 90, the executing template may call the burn-rates endpoint 54B to determine the current burn rate of the new version of the application with respect to the relevant SLOs and, when the burn rates exceed the corresponding threshold values, the executing template may respond by performing a routing action to route traffic away from the new version and back to the previous version of the application as part of a rollback process. For embodiments in which the SLO-based CICD framework 10 does not support callbacks, rollback decisions may only be made at each of the time steps D-L to determine whether the burn rate is above the threshold and whether the rollout should proceed. Time steps E, F, and G represent similar additional routing action points, which generally operate as described above for time step D. As illustrated in FIG. 3, the time between the first routing decision (e.g., time step C) and the final routing decision (e.g., time step G) is indicated as the minimum deployment time 92.

At time step H, there is another evaluation to determine whether the traffic volume routed to the previous version of the application should be scaled to zero. For example, at time step H, the executing template calls the burn-rates endpoint 54B to determine the current burn rate of the new version of the application with respect to the relevant SLOs and, when the burn rates remain below the threshold amount, all running instances of the previous version of the application are forced offline. It may be appreciated that this approach is useful for applications that scale by instance count instead of HTTP traffic, such as KAFKA. Time steps I, J, K, and L have no special meanings and are merely shown to represent the passage of time.

At time step M, the configurations 36 for the previous version of the application are removed from the software deployment platform 32. At this point, the SLO-based CICD framework 10 is committed to the new version of the application, as simple rollback options from the software development platform 38 are no longer possible. For the illustrated embodiment, after time step H and before time step M, the template continues to monitor burn rates for at least a minimum alert criteria long window 94 at 100% full traffic. This is done to allow for the normal SRE alerts to catch anything that could have been missed by the rollout process and/or provide the option for an IT professional to intervene and perform a manual rollback (e.g., in response to the burn rate being too high for their preferences).

FIG. 4A is a schematic diagram illustrating an example of how burn rates are determined in a multi-window manner by the SLO-based CICD framework 10 in certain embodiments. In FIG. 4A, each of the solid lines 110 represent a time step, while each of the dotted lines 112 represent a metric delay. The metric delay corresponds to how long it takes for the SLO metrics 50 to be updated to include information that can be used to evaluate burn rates associated with the new version of the application during Canary deployment. As noted above for the first routing action (e.g., time step C in the example of FIG. 3), the executing template calls the burn-rates endpoint 54B to perform a single-window burn rate evaluation using a short window (e.g., short window P 114A in FIG. 4) to determine the current burn rates of the new version of the application with respect to each of the relevant SLOs. However, as deployment progresses, subsequent calls to the burn-rates endpoint 54B results in a multi-window burn rate analysis using both a short window evaluation and a long window evaluation (e.g., the short window P 114A and the long window P 116A, the short window Q 114B and the long window Q, the short window R 114C and the long window R 116C). As illustrated, the long windows 116 and the short windows 114 factor in the metric delay. Additionally, as illustrated, while the short windows 114 each include the same amount of time, the long windows 116 continue to increase in duration until a maximum duration is reached. In certain embodiments, the maximum duration of the long windows corresponds to the minimum alert criteria long window 94, as illustrated in FIG. 3.

Table 1 is an example of a multi-window burn rate chart that demonstrates alert criteria for different multi-window burn rate evaluations for a particular 30-day SLO. These include a high-priority or critical-severity alert, a medium-priority or medium-severity alert, or a low-priority or low-severity alert. For the indicated example, a high-priority alert (e.g., a page event) is triggered in response to an evaluated burn rate of 14.4, which is calculated based on 2% of the error budget of the SLO being consumed over the long window, when the long window is one hour and the short window is 5 minutes. For the indicated example, a medium-priority alert (e.g., an alert event) is triggered in response to an evaluated burn rate of 6, which is calculated based on 5% of the error budget of the SLO being consumed over the long window, when the long window is six hours and the short window is 30 minutes. For the indicated example, a low-priority alert (e.g., a ticket event) is triggered in response to an evaluated burn rate of 1, which is calculated based on 10% of the error budget of the SLO being consumed over the long window, when the long window is three days and the short window is six hours.

TABLE 1

Example multi-window burn rate chart demonstrating different alert criteria.

| Alert | Event | Severity | Long Window | Short Window | Burn Rate | Error Budget Consumed over Long Window |
|---|---|---|---|---|---|---|
| High-priority Alert | Page Event | Critical/ High | 1 hour | 5 minutes | 14.4 (30 * 24 * 0.02) | 2% |
| Medium-priority Alert | Alert Event | Medium | 6 hours | 30 minutes | 6 (30 * 4 * 0.05) | 5% |
| Low-priority Alert | Ticket Event | Low | 3 days | 6 hours | 1 (10 * 0.10) | 10% |

FIG. 4B is a schematic diagram illustrating an example of the factors that contribute to calculating the duration of a step window in certain embodiments. The step window refers to the amount of time between time steps D and E, time steps E and F, time steps F and G, and so forth, as illustrated in FIG. 3. As illustrated in FIG. 4B, each of the points T-Z represents points in time, wherein the total time between times T and Z represents a single step window. As illustrated, the calculation of the step window begins with the metric delay for the metric represented between times T and U, which is the time it takes for the SLO metrics 50 to arrive from production to be evaluated (e.g., 2 to 3 minutes). Next, a minimum alert short window is added to the metric delay, which is represented between times U and V. The minimum alert short window generally corresponds to the duration of the short windows 114 of the multi-window burn rate calculation discussed above with respect to FIG. 4A, which may be 5 minutes in certain embodiments.

For the embodiment illustrated in FIG. 4B, the amount of time from time V to time Z may vary depending on the traffic volume of the application. For example, the higher the traffic volume of the new version of the application that is being deployed, the faster the minimum alert threshold for the given alert criteria (e.g., high, medium, low) is met. This can result in the step window ending closer to time V (e.g., at time W) or result in a lower percentage of traffic routed to the new version of the application until time Z. The step window from time T to time Z is capped equal to the minimum deployment time 92 (as illustrated in FIG. 3) divided by the minimum number of deployment steps of the Canary deployment. For some embodiments, multiple routing actions are used by default (e.g., at times W, X, Y, and Z) to avoid scaling issues when moving traffic from the previous version of the application to the new version of the application. If the amount of time between times V and Z is larger than that from time T to time V, then a default step percentage may be used for the first routing decision, which is 100 divided by the minimum production deployment steps (e.g., 25%).

For a Canary deployment, a general goal of the SLO-based CICD framework 10 is to minimize the amount of traffic affected, or error budget consumed, by each deployment step (e.g., each routing action), while maintaining an upper and lower bound on time and number of steps to deploy the new version of the application. In some embodiments, static step percentages and static step windows are determined by the SLO-based CICD framework 10, while in other embodiments, step percentages and step windows are dynamically calculated.

For embodiments in which the step percentages and step windows are dynamically calculated, the calculation can depend on a number of different factors. These factors include metric delay, which is how long it takes for the new SLO metric data from the routing change to be available, as it is presently recognized that there is no reason to move traffic faster than the updated metric data is available. Another factor is, for each relevant SLO, how much of the effective error budget is remaining for the given 30-day period. For example, for a SLO that is trending down during a Canary deployment, the SLO-based CICD framework 10 may increase the maximum deployment time and the number of routing actions, which decreases the percentage of traffic routed to the new version of the application at each routing action step. This enables the SLO-based CICD framework 10 to cautiously perform the Canary deployment in light of the reduced error budget for the downward trending SLO.

Other factors that the SLO-based CICD framework 10 may use in dynamically calculating the step percentages and step windows include the alert criteria and alert window. These include a minimum threshold value for an alert to be triggered, which is used for applications or services having periods of low volumes (e.g., 0-10 request per 5 minutes), the minimum traffic to evaluate a routing action, and the minimum time for the short window of the multi-window burn rate calculation. Additionally, the current traffic volume is also a factor. For example, since traffic volume may be highest during the day and lower at night, the SLO-based CICD framework 10 may compensate the Canary deployment process to adjust for this by increasing step percentages to compensate for lower traffic volumes, up to a predefined upper bound.

For a Canary deployment, the multi-window burn rate calculations performed by the burn-rates endpoint 54B of the CICD API 52 depend on a number of factors, including the alert criteria and alert window. For a particular SLO, the burn-rates endpoint 54B may determine the error budget consumed over a short window and a long window, and then use these values to extrapolate the burn rate over a time period associated with the SLO (e.g., 30-days). For example, an error budget consumption of 2% in 1 hour is equivalent to a burn rate of 14.4, an error budget consumption of 5% in 6 hours is equivalent to a burn rate of 6, and an error budget consumption of 10% in 3 days is equivalent to a burn rate of 1. When possible, the burn-rates endpoint 54B determines both the short window burn rate and the long window burn rate for a given SLO, as well as the minimum volume threshold needed to evaluate these burn rates.

The multi-window burn rate calculations performed by the burn-rates endpoint 54B of the CICD API 52 also depend on an amount of time (e.g., in seconds) that has passed since traffic was initially routed to the new version of the application being deployed. The burn-rates endpoint 54B may use this value to determine the duration of the long window, which reduces sensitivity of the SLO-based CICD framework 10 to false positives from blips or spikes from transient issues. Additionally, for high-jitter SLOs, multi-window burn rate calculations performed by the burn-rates endpoint 54B of the CICD API 52 also depend on the percentage of traffic currently routed to the new version of the application. A high-jitter SLO refers to an SLO in which there is a high amount of variance in response times (e.g., high latency). Generally, high-jitter SLOs generally even out as traffic volume is increased; however, the error budget may be adjusted during periods of low traffic volumes. For example, the burn-rates endpoint 54B may adjust the burn rate to compensate for the amount of traffic pointing to the new version of the application, since the new version is the one being evaluated. It is also presently recognized that lower percentages of traffic routed to the new version of the application results in higher burn rates to compensate for priming and missed caching of results.

The multi-window burn rate calculations performed by the burn-rates endpoint 54B of the CICD API 52 also depend on an amount of time since the last routing action. The burn-rates endpoint 54B may use this value, in combination with the short window time and the minimum volume threshold, to determine a confidence value in the routing decision. For example, the confidence values may include a full confidence value in which the traffic volume is sufficient to evaluate the long window burn rates and the short window burn rates, a partial confidence value in which the traffic volume is sufficient to evaluate the burn rates using just the short window, and a no confidence value in which the traffic volume is insufficient to evaluate the burn rates using the long or short window.

The multi-window burn rate calculations performed by the burn-rates endpoint 54B of the CICD API 52 advantageously avoid the noise introduced by a blip or spike in the SLO burn rates during rollout. For example, such blips or spikes may occur as transient issues with dependency calls when migrating a pod to a new server or restarting a pod. The short window used by the burn-rates endpoint 54B is equal to the seconds between routing steps minus the metric delay, and is sometimes referred to as the evaluation window. The long windows used by the burn-rates endpoint 54B are equal to the seconds since start of the Canary deployment, up until the Minimum Critical Alert Criteria Long Window duration is reached. For example, for a Canary deployment with a minimum deploy time greater than 1 hour and a minimum critical alert criteria long window of 1 hour, the long windows will only consider SLO metrics from the previous hour when determining the multi-window burn rates.

Figure 5A:
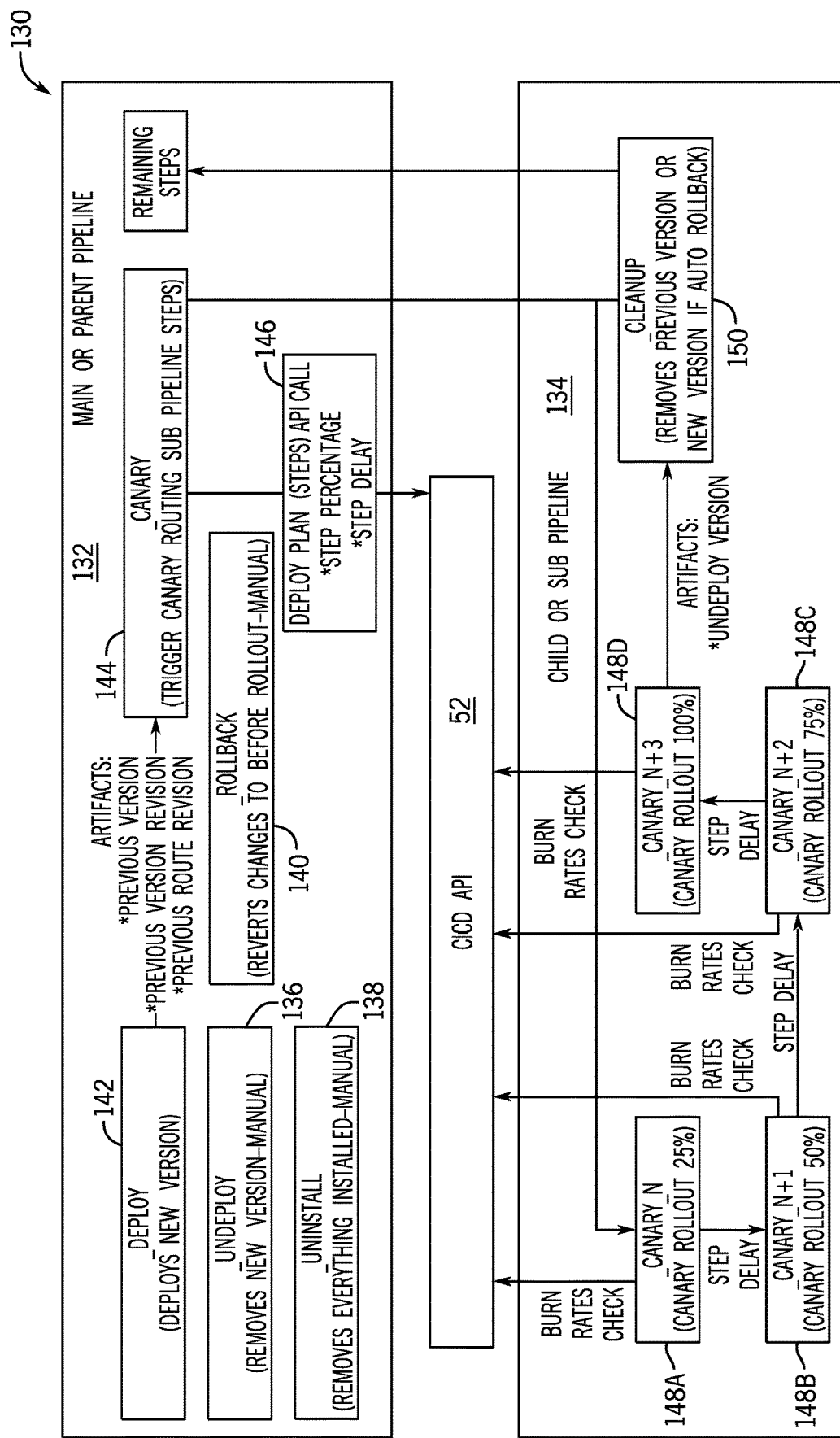
FIG. 5A is a diagram of a pipeline flow overview illustrating actions from the perspective of an executing template of the software development system operating in concert with the CICD API during an example Canary deployment, in accordance embodiments of the present technique.

FIG. 5A is a diagram of a pipeline flow overview 130 illustrating actions from the perspective of an executing templates 42 (e.g., pipeline templates) of the software development platform 38, operating in concert with the CICD API 52, during an example Canary deployment. The example Canary deployment illustrated in FIG. 5A involves a main or parent pipeline 132, a child pipeline 134, and the CICD API 52. For the illustrated embodiment, the parent pipeline 132 defines a number of actions or functions that can be manually called, including: an undeploy function 136 that removes the new version of the application after a failed Canary deployment, an uninstall function 138 that removes all versions of the application and the corresponding route, and a rollback function 140 that rollback the deployment routing actions and scaling steps from a previous deployment.

For the embodiment illustrated in FIG. 5A, the parent pipeline 132 includes a number of actions or functions that can be executed to enable the example Canary deployment. These include a deploy function 142 that begins the Canary deployment process for the new version of the application. As illustrated, the deploy function 142 calls the Canary function 144 that, in turn, calls the deploy-plan endpoint 54A of the CICD API 52 and receives the Canary deployment plan, including the step percentages and step delays, as indicated by block 146. The Canary function 144 of the parent pipeline 132 then spawns the child pipeline 134 and passes the Canary deployment plan to the child pipeline 134 to perform the steps of the Canary deployment plan. In some embodiments, an additional prevalidate function may be interposed between the deploy and Canary functions to enable performance testing as a pre-verification of the new version of the application prior to deployment, as discussed in greater detail below.

For the embodiment illustrated in FIG. 5A, based on the received deployment plan, the child pipeline 134 performs a number of routing actions 148, in which the percentage of the traffic routed to the new version of the application is increased to 25% in a first routing action 148A, to 50% in a second routing action 148B, to 75% in a third routing action 148C, and to 100% in a fourth routing action 148D. During each of the routing actions 148, the child pipeline 134 performs burn rate checks by calling the burn-rates endpoint 54B of the CICD API 52 to determine the burn rates for the relevant SLOs as the percentage of traffic routed to the new version of the application increases. Moreover, the child pipeline 134 only proceeds to the next routing actions when the burn rates remain below acceptable thresholds. Subsequently, the child pipeline 134 calls a cleanup function 150 that, in the case of a successful deployment of the new version of the application, removes the previous version of the application, and in the case of an automatic rollback due to excessive burn rates, removes the new version of the application.

Figure 5B:
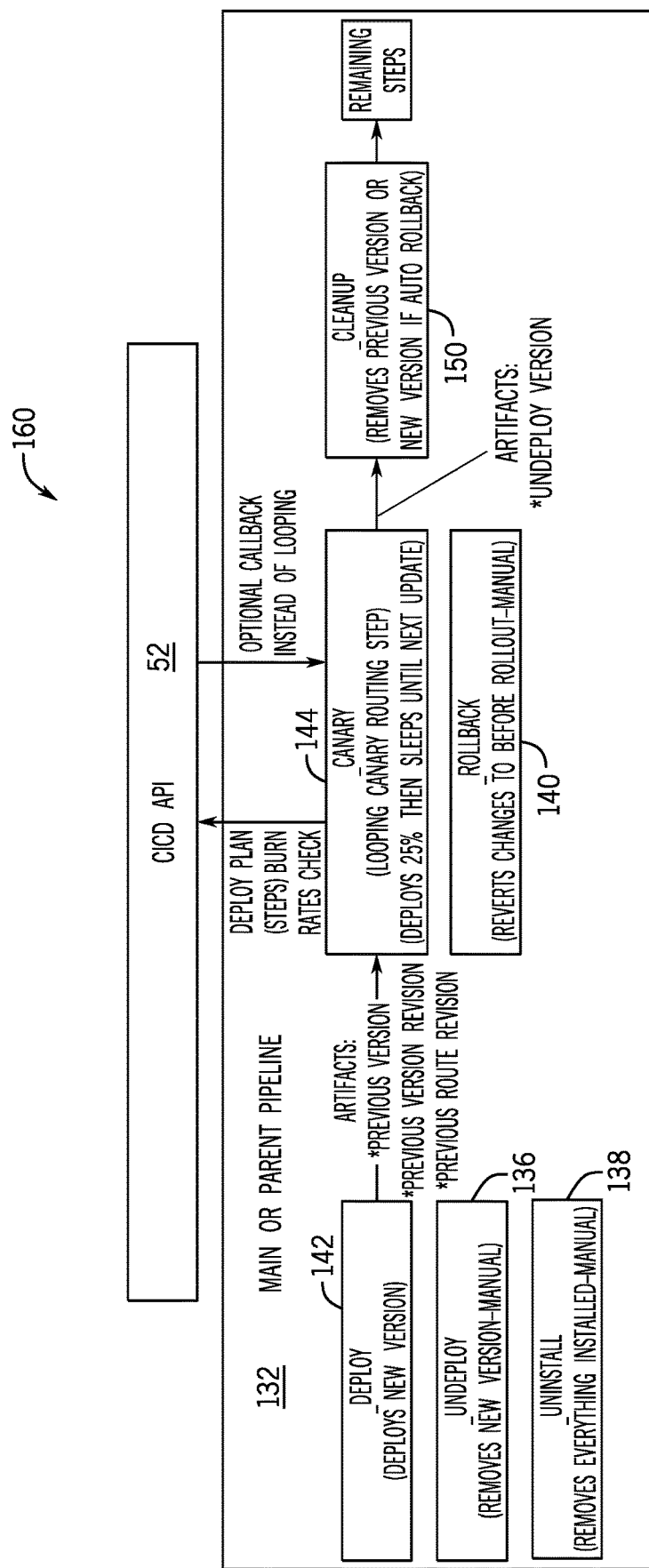
FIG. 5B is a diagram of another example pipeline flow overview illustrating actions from the perspective of an executing template of the software development system operating in concert with the CICD API during an example Canary deployment, in accordance embodiments of the present technique.

FIG. 5B is a diagram of another example pipeline flow overview 160 illustrating actions from the perspective of an executing template 42 (e.g., pipeline templates) of the software development platform 38, operating in concert with the CICD API 52, during an example Canary deployment. The example Canary deployment illustrated in FIG. 5A involves a main or parent pipeline 132 that supports callbacks and the CICD API 52. Unlike the example illustrated in FIG. 5A, after each of the routing actions, the Canary function 144 sleeps until it is "called back" by the CICD API 52 indicating the burn rates of the relevant SLOs after increasing the percentage of traffic volume routed to the new version of the application.

In an example embodiment of FIG. 5B, the flow of the Canary function 144 includes a number of steps or actions that are performed during execution of one or more templates 42 (e.g., pipeline templates) of the software development platform 38 during an example Canary deployment. For example, the Canary function may first initialize variables, including primary and secondary URIs for accessing the CICD API 52. The Canary function 144 may call the deploy-plan endpoint 54A of the CICD API 52 and receive the Canary deployment plan, including the step percentages and step delays, and the function may include default values for these step percentages and step delays if the call to the deploy-plan endpoint 54A fails. The Canary function 144 may also initialize other variables, such as a pipeline start time, indicating the time elapsed (e.g., in seconds) since the deploy function of the executing template was called, which is used to determine the duration of the long widow for later burn rate evaluations. The Canary function 144 may determine route and deployment names, for example, by prefixing the application name with a naming convention tag. The Canary function 144 may also determine the current state of the Canary deployment, such as never deployed, unfinished deployment, new Canary deployment, or finished deployment. For an unfinished deployment, the Canary function 144 may validate that a secondary route is not pointing to a missing deployment, and if it is, determine that the state is actually a finished deployment. Additionally, the Canary function 144 may load one or more configurations 36 of the software deployment platform 32 for the new version of the application, which defines a service identifier (ID) of the new version of the application, alert criteria for the burn rate evaluation defining what is classified as a low, medium, or high priority burn rate alert, and a set of one or more SLOs 46 of the SLO repository 44 that are relevant to the Canary deployment.

Continuing through the pipeline flow overview 160 of FIG. 5B, the Canary function 144 may perform one or more steps or actions for each of the routing actions of the Canary deployment. For example, the Canary function 144 may first call the burn-rates endpoint 54B of the CICD API 52 to determine the burn rates for the relevant SLOs, and provide as inputs to the endpoint, information from the one or more configurations 36 of the software deployment platform 32 for the new version of the application, the pipeline start time, routing actions already performed, the amount of time that has elapsed since the last routing action, and the current percentage of traffic routed to the new version of the application. If the burn-rates endpoint 54B of the CICD API 52 returns an indication that at least one of the relevant SLOs has been breached by the previous routing actions of the deployment, then the Canary function 144 may respond by initiating rollback or halting the Canary deployment. The Canary function 144 may then calculate the percentage of traffic for the next routing action, as well as any changes to the scaling, for both the previous version and the new version of the application. In certain embodiments, when adjusting the percentage of traffic and/or scaling of the versions of the application, the Canary function 144 may first update the scaling settings with respect to the new version of the application, then wait for a time window defined by the one or more configurations 36 of the new version of the application, then update the percentage of the traffic routed to the new version of the application, and finally update the scaling settings with respect to the previous version of the application. It may be noted that for implementations that support callbacks, as discussed with respect to FIG. 5B, the Canary function 144 may subsequently recalculate the step percentages and the step delays of later routing steps of the deployment plan to adjust for any changes in traffic volume since the previous burn rate evaluation.

Figure 6:
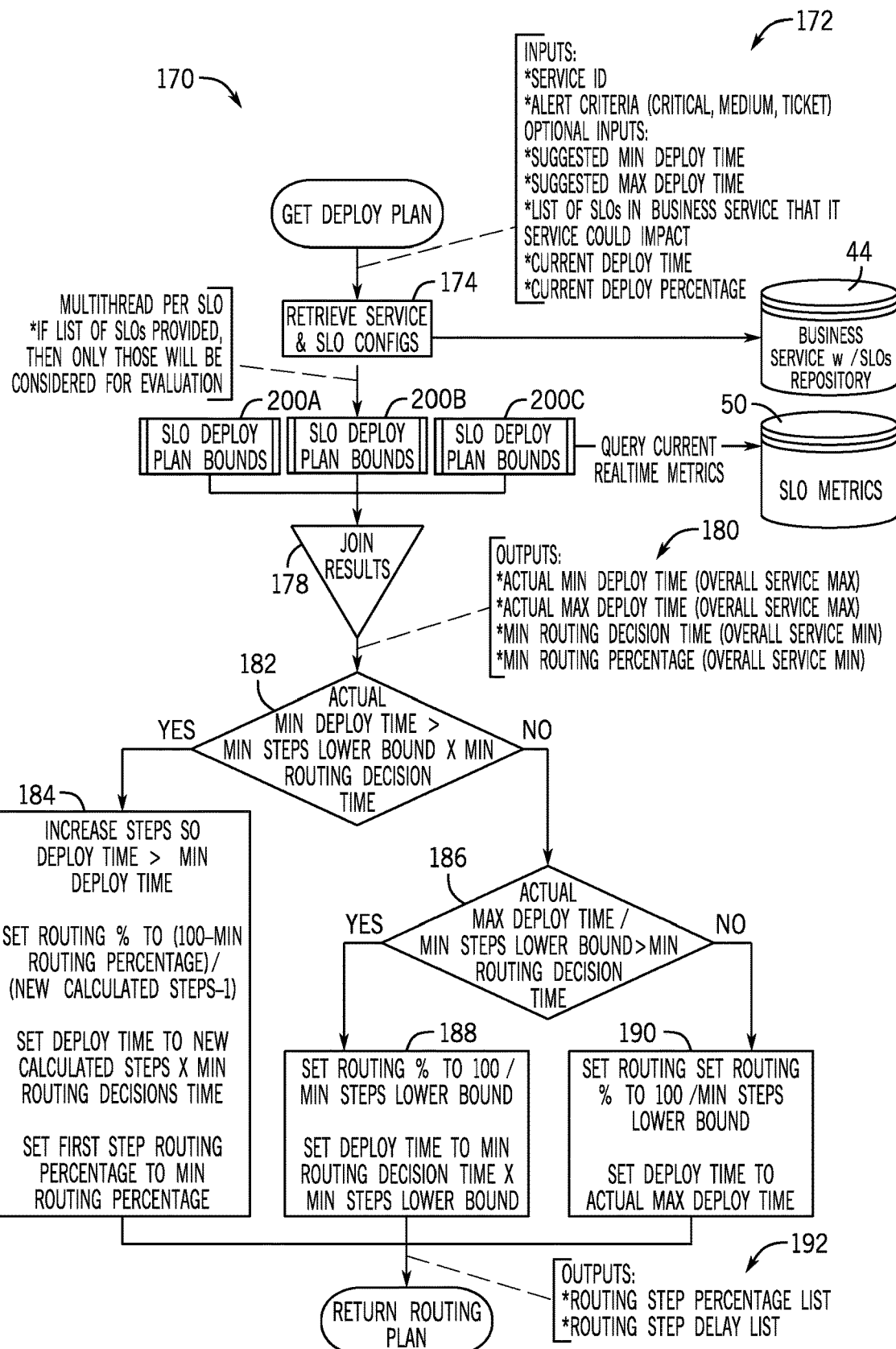
FIG. 6 is a flow diagram illustrating an embodiment of a process that is performed by a deploy-plan endpoint of the CICD API to determine a deployment plan for a Canary deployment, in accordance embodiments of the present technique.

FIG. 6 is a flow diagram illustrating an embodiment of a process 170 that is performed by the deploy-plan endpoint 54A of the CICD API 52 to determine a deployment plan for a Canary deployment. As noted above, the deploy-plan endpoint 54A receives certain information as inputs 172 in order to determine the deployment plan for a Canary deployment, wherein these inputs may be retrieved from configurations 36 of the software deployment platform 32, received as parameters when the endpoint is called, or any combination thereof. For the embodiment illustrated in FIG. 6, the inputs 172 include a service identifier (ID) of the new version of the application being deployed, as well as the alert criteria (e.g., as illustrated in Table 1), which defines what constitutes a low, medium, and high-priority alert with respect to each of the relevant SLOs 46. In certain embodiments, the inputs 172 may also include one or more of the following: a suggested minimum deployment time for the Canary deployment, a suggested maximum deployment time for the Canary deployment, a set of the SLOs that are relevant to (and should be monitored during) the Canary deployment, an amount of time that has passed since the Canary deployment began, and/or a current percentage of traffic to be routed to the new version of the application in the next routing action of the Canary deployment.

For the embodiment illustrated in FIG. 6, the process 170 begins with the deploy-plan endpoint 54A retrieving (block 174) configuration information for SLOs 46 from the SLO repository 44 that are related to (e.g., affected by, impacted by) the new version of the application being deployed. In some embodiments, all of the SLOs 46 defined in the SLO repository 44 that are related to the new version of the application may be retrieved. For embodiments in which the set of relevant SLOs was provided as part of the inputs 172, the deploy-plan endpoint 54A may limit retrieval to these particular SLOs. For each of the SLOs retrieved in block 174, the deploy-plan endpoint 54A spawns a respective thread or sub-process that independently executes a SLO deployment plan bounds sub-process 200 (e.g., blocks 200A, 200B, 200C, and so forth) with respect to each of the SLOs. As illustrated in FIG. 6, the executions of the SLO deployment plan bounds sub-process 200 generally involve retrieving SLO metrics 50 for each the SLOs, and the results of each execution are subsequently combined (block 178) into a set of outputs 180 that define the actual minimum deployment time, the actual maximum deployment time, the minimum routing action time, the minimum routing percentage, and a lower bound for the minimum number of deployment steps (e.g., routing actions) for the Canary deployment, based on all of the relevant SLOs and their corresponding metrics. The actions of the SLO deployment plan bounds sub-process 200 are discussed in greater detail with respect to FIG. 7.

For the embodiment illustrated in FIG. 6, the process 170 continues with the deploy-plan endpoint 54A determining (decision block 182) whether the actual minimum deployment time is greater than the multiplication product of the lower bound for the minimum number of deployment steps (e.g., routing actions) and the minimum routing action time for the Canary deployment. When it is greater, the deploy-plan endpoint 54A responds by (block 184): increasing the number of deployment steps, such that the deployment time is greater than the minimum deployment time; setting the percentage of the traffic routed to the new version of the application to be a value calculated by subtracting the minimum routing percentage from 100, and then dividing the result by one less than the number of new deployment steps; setting the deployment time to be the multiplication product of the number of deployment steps and the minimum routing action time; and setting the percentage of traffic routed to the new version of the application in the first routing action to be the minimum routing percentage.

For the embodiment illustrated in FIG. 6, when the deploy-plan endpoint 54A determines, in decision block 182, that the actual minimum deployment time is less than the multiplication product of the lower bound for the minimum number of deployment steps (e.g., routing actions) and the minimum routing action time for the Canary deployment, the deploy-plan endpoint 54A responds by determining (decision block 186) whether the actual maximum deployment time divided by the lower bound on the minimum number of deployment steps is greater than the minimum routing action time. When it is greater, the deploy-plan endpoint 54A responds by (block 188): setting the percentage of traffic to be routed to the new version of the application to 100 divided by the lower bound of the minimum number of deployment steps for the Canary deployment; and setting the deployment time to be the product of the minimum routing action time and the lower bound of the minimum number of deployment steps for the Canary deployment. In decision block 186, when the deploy-plan endpoint 54A determines that the calculated value is not greater than the minimum routing action time, the deploy-plan endpoint 54A responds by (block 190): setting the percentage of traffic routed to the new version of the application to 100 divided by the lower bound of the minimum number of deployment steps for the Canary deployment; and setting the deployment time to the actual maximum deployment time for the Canary deployment. As illustrated, the process 170 concludes with the deploy-plan endpoint 54A returning the deployment plan 192, which includes a set of step percentages and a set of step delays for the Canary deployment.

Figure 7:
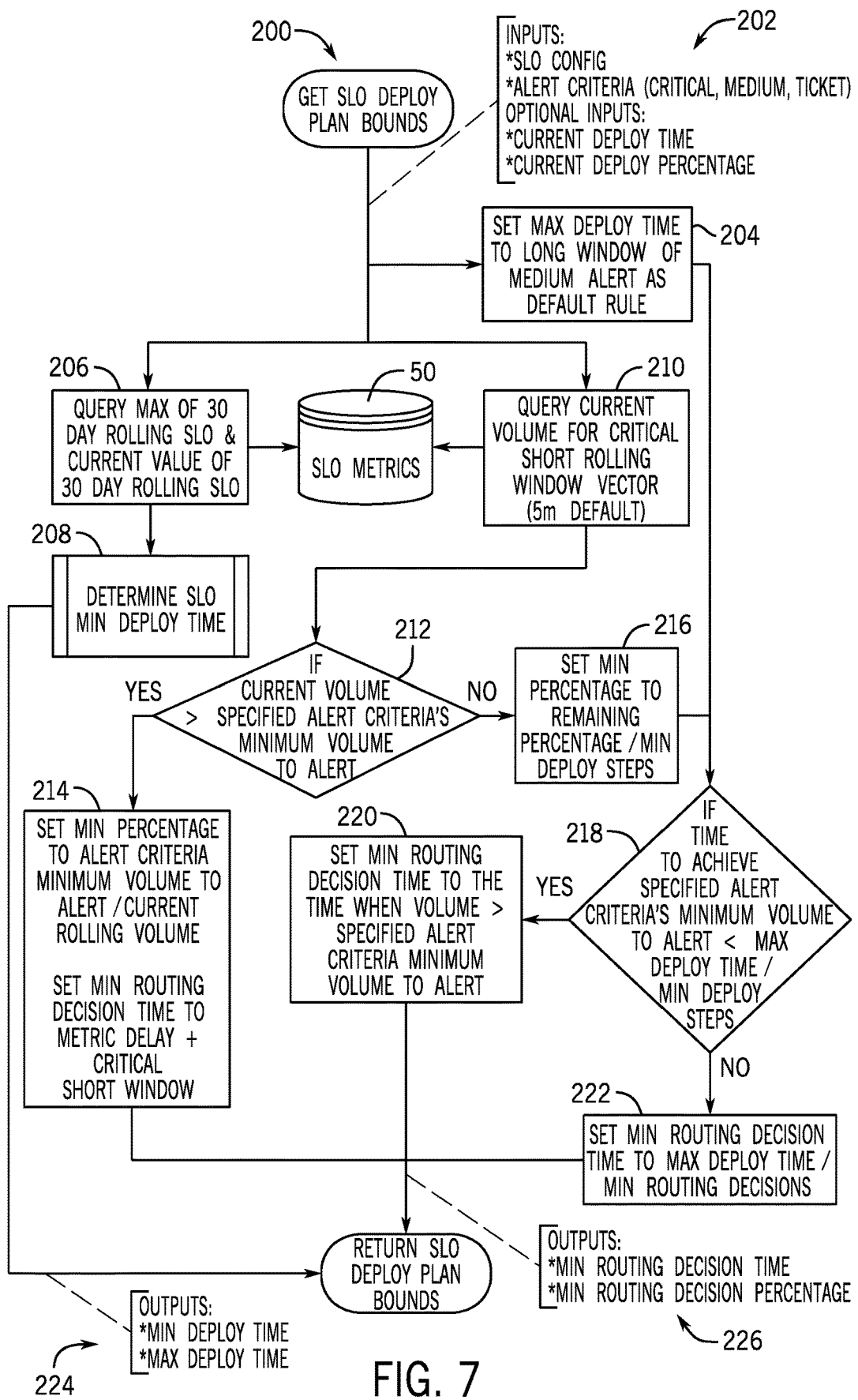
FIG. 7 is a flow diagram illustrating an embodiment of a SLO deployment plan bounds sub-process that is called by the deploy-plan endpoint of the CICD API to determine the bounds of a Canary deployment plan with respect to a particular SLO, in accordance embodiments of the present technique.

FIG. 7 is a flow diagram illustrating an embodiment of a SLO deployment plan bounds sub-process 200 that is called by the deploy-plan endpoint 54A of the CICD API 52 to determine the bounds of a Canary deployment plan with respect to a particular SLO (e.g., a 30-day SLO). The sub-process 200 receives certain information as inputs 202 in order to determine the deployment plan for a Canary deployment, wherein these inputs may be retrieved from configurations 36 of the software deployment platform 32, received as parameters when the sub-process is called, or any combination thereof. For the embodiment illustrated in FIG. 7, the inputs 202 include configuration information for the particular SLO and the alert criteria, which defines what constitutes a low, medium, and high-priority alert with respect to the particular SLO. In certain embodiments, the inputs 202 may also include an amount of time that has passed since the current Canary deployment began, and/or a current percentage of traffic routed to the new version of the application in the next routing action as part of the Canary deployment.

For the embodiment illustrated in FIG. 7, the SLO deployment plan bounds sub-process 200 includes setting (block 204) the maximum deployment time to the long window of the medium-priority alert defined in the alert criteria of the SLO. The sub-process 200 also includes querying the SLO metrics 50 of the time-series database 48 to determine the maximum value and a current value for the SLO with respect to a 30-day rolling time window (block 206). The SLO metrics queried in block 206 are used to determine the maximum deployment time, and as parameters when calling (block 208) a SLO minimum deployment time sub-process to determine the minimum deployment time, as discussed in greater detail with respect to FIG. 8. The SLO metrics 50 are also queried (block 210) to determine the current traffic volume for the new version of the application over a rolling time window equivalent to the short window of the high-priority alert defined in the alert criteria of the SLO. Subsequently, at decision block 212, the SLO deployment plan bounds sub-process 200 determines whether the current traffic volume is greater than a minimum traffic volume to generate an alert, as defined by the alert criteria of the SLO. When it is, the SLO deployment plan bounds sub-process 200 responds by (block 214) setting the minimum percentage of traffic to be routed to the new version of the application at each deployment step to be the minimum traffic volume required to generate an alert divided by the traffic volume over a short rolling window; and setting the minimum routing action time to the sum of the metric delay and the short window of the critical alert, as defined by the alert criteria.

For the embodiment illustrated in FIG. 7, when the SLO deployment plan bounds sub-process 200 determines, in decision block 212, that the current traffic volume is not greater than the minimum traffic volume to generate an alert, the SLO deployment plan bounds sub-process 200 responds by setting (block 216) the minimum percentage of traffic to be routed to the new version of the application to be the total remaining percentage of the traffic to be routed to the new version divided by the minimum number of deployment steps. Subsequently, at decision block 218, the SLO deployment plan bounds sub-process 200 determines whether the amount of time to achieve the minimum traffic volume to generate an alert, as defined by the alert criteria of the SLO, is less than the quotient of the maximum deployment time and the minimum number of deployment steps. When it is, the SLO deployment plan bounds sub-process 200 responds by setting (block 220) the minimum routing action time to a time when the traffic volume is greater than the minimum traffic volume to generate an alert. When the SLO deployment plan bounds sub-process 200 determines, in decision block 218, that the amount of time to achieve the minimum traffic volume to generate an alert is greater than or equal to the quotient of the maximum deployment time and the minimum number of deployment steps, the SLO deployment plan bounds sub-process 200 responds by setting (block 222) the minimum routing action time to the maximum deployment time divided by the minimum number of routing decisions. As illustrated, the SLO deployment plan bounds sub-process 200 concludes by returning outputs 224 and 226, including the minimum deployment time, the maximum deployment time, the minimum routing action time, and the minimum routing action percentage for the Canary deployment based on the particular SLO.

Figure 8:
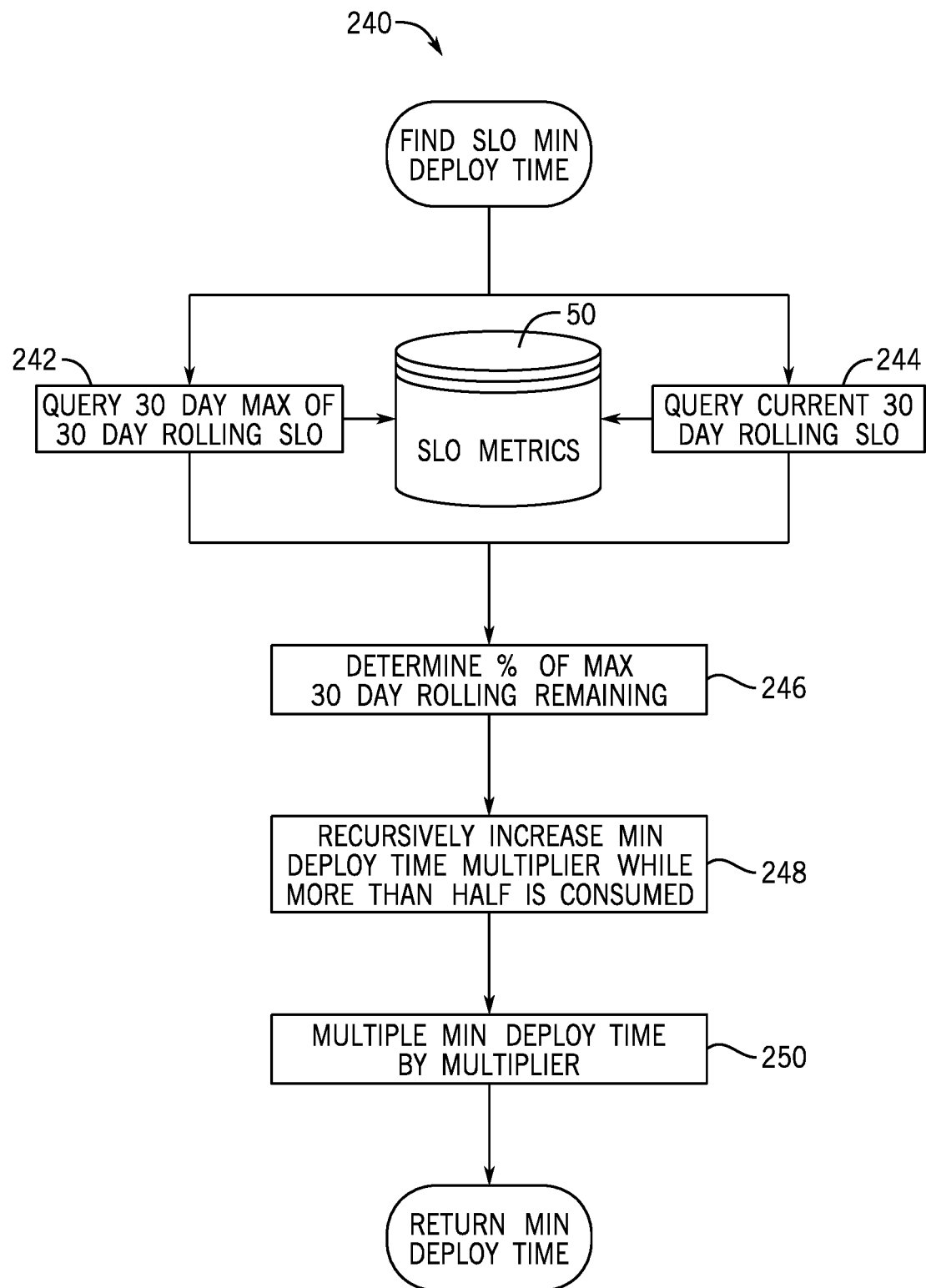
FIG. 8 is a flow diagram illustrating an embodiment of a SLO minimum deployment time sub-process that is called by the SLO deployment plan bounds sub-process to determine the minimum deployment time of the Canary deployment plan with respect to a particular SLO, in accordance embodiments of the present technique.

FIG. 8 is a flow diagram illustrating an embodiment of a SLO minimum deployment time sub-process 240 that is called by the SLO deployment plan bounds sub-process 200 of FIG. 7 to determine the minimum deployment time of the Canary deployment plan with respect to a particular 30-day SLO. For the embodiment illustrated in FIG. 8, the SLO minimum deployment time sub-process 240 begins with querying (block 242) the SLO metrics 50 of the time-series database 48 to determine a maximum value for the SLO with respect to a 30-day rolling time window, and querying (block 244) the SLO metrics 50 determine a current value for the SLO with respect to a 30-day rolling time window. Using the retrieved SLO metrics, the SLO minimum deployment time sub-process 240 determines (block 246) a maximum percentage of the error budget that is remaining in the 30-day rolling time window to be the queried current value for the SLO for the 30-day rolling time window divided by the difference between the queried maximum value for the SLO for the 30-day rolling time window and the target value for the SLO, as defined within the SLO configuration of the SLO in the SLO repository 44.

For the embodiment illustrated in FIG. 8, in block 248, the SLO minimum deployment time sub-process 240 recursively or iteratively increases an integer minimum deployment time multiplier value (which initially has a value of 1) until the maximum percentage of the error budget remaining is greater than or equal to 100% divided by 2 raised to the power of the minimum deployment time multiplier value, or until the product of the minimum deployment time multiplier value and the minimum deployment time is greater than or equal to the maximum deployment time. Once the minimum deployment time multiplier value has been increased to a suitable value, the SLO minimum deployment time sub-process 240 multiplies the minimum deployment time by the minimum deployment time multiplier value (block 250), and returns the product as the minimum deployment time for the Canary deployment.

Figure 9:
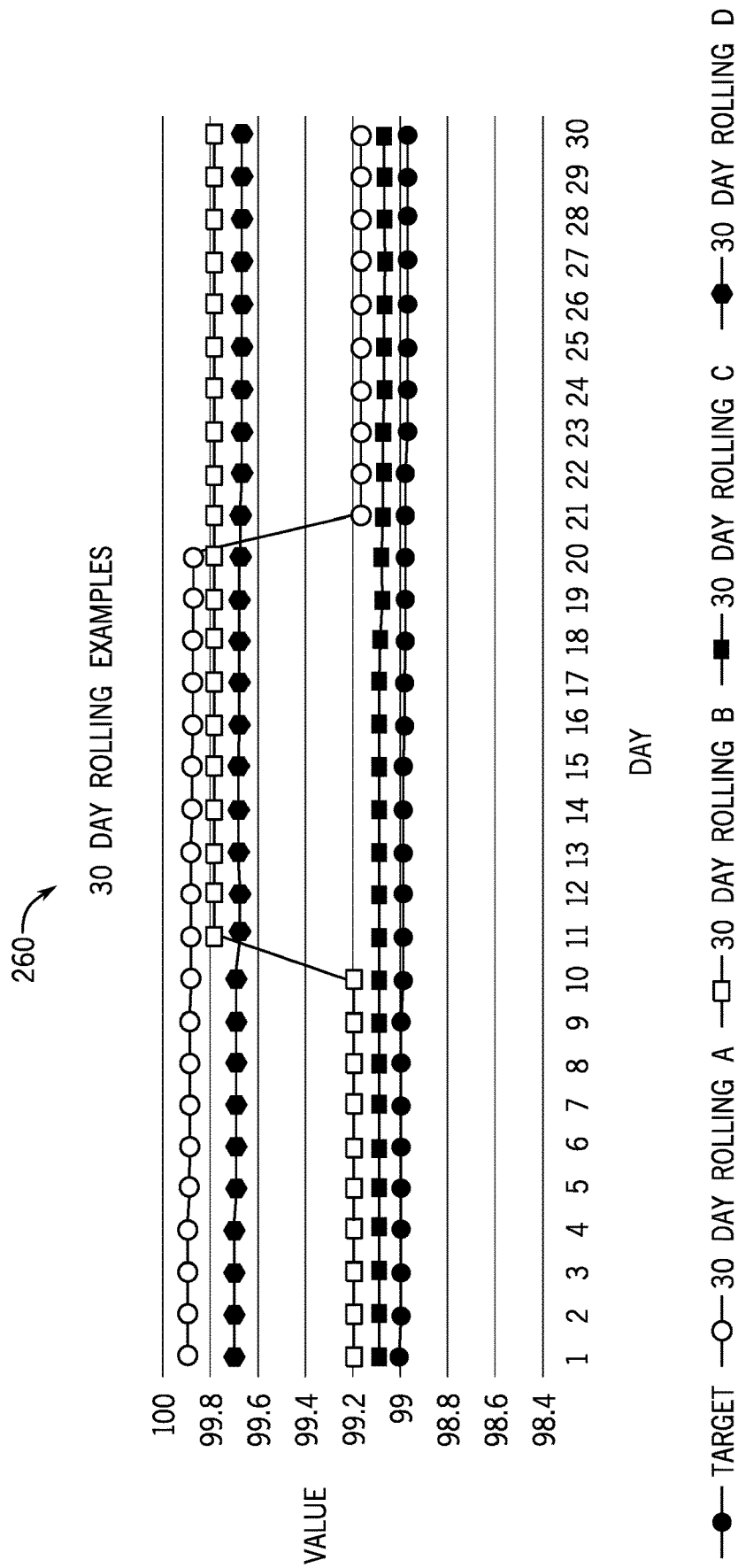
FIG. 9 a graph plotting different example 30-day rolling SLO values, as well as a target value for these SLOs, plotted as a function of time in days, in accordance embodiments of the present technique.

To better explain the SLO minimum deployment time sub-process 240 of FIG. 8, FIG. 9 is a graph 260 plotting different example 30-day rolling SLO values (e.g., SLOs A, B, C, and D) and a target value for these SLOs, plotted as a function of time in days. The target value for the SLOs may be defined in SLO configurations in the SLO repository 44 for the various example SLOs. For healthy services with steady state 30-day rolling values, such as SLO D, it may not be desirable to increase the minimum deploy time. Additionally, it is undesirable for teams to artificially inflate SLO error budgets by decreasing the target for applications with a higher rate of failures, but in a steady state, since a healthy amount of error budget has likely already been factored in to allow for an IT response before it is exhausted (e.g., SLO C in FIG. 9). Additionally, it may be undesirable for deployments to take an excessive period of time for a recovered service (e.g., SLO B in FIG. 9). In some embodiments, a goal is primarily to increase the minimum deployment time for an application that is in an unhealthy downward trend, wherein extra caution should be exercised to not introduce other issues that could deplete what little of the error budget is remaining, as this might not allow adequate time for an IT response before the SLO breaches the 30-day target value.

For the example SLOs illustrated in the graph 260 of FIG. 9, when determining the maximum value for the SLO with respect to a 30-day rolling time window (block 242 of FIG. 8), the maximum value is 99.9 for SLO A, is 99.8 for SLO B, is 99.1 for SLO C, and is 99.7 for SLO D. For the example SLOs illustrated in FIG. 9, when determining the current value for the SLO with respect to a 30-day rolling time window (block 244 of FIG. 8), the current value is 99.2 for SLO A, is 99.8 for SLO B, is 99.1 for SLO C, and is 99.7 for SLO D. For the example SLOs illustrated in FIG. 9, when determining the maximum percentage of the error budget that is remaining in the 30-day rolling time window (block 246 of FIG. 8), the maximum percentage of the error budget remaining is (99.2-99)/(99.9-99) or 22.22% for SLO A; is (99.8-99)/(99.8-99) or 100% for SLO B; is (99.1-99)/(99.1-99) or 100% for SLO C; and is (99.7-99)/(99.7-99) or 100.00% for SLO D. As such, for the example SLOs illustrated in FIG. 9, at block 248, when the minimum deployment time multiplier value is initially set to a value of 1 for SLO B, C, and D, the maximum percentage of the error budget remaining is greater than or equal to 50%, so the minimum deployment time multiplier value retains its original value. However, when the minimum deployment time multiplier value is initially set to a value of 1 for SLO A, the maximum percentage of the error budget remaining (i.e., 22.22%) is less than 50%, so the minimum deployment time multiplier value is incremented. When the minimum deployment time multiplier value is incremented to a value of 2 for SLO A, the maximum percentage of the error budget remaining (i.e., 22.22%) is less than 25%, so the minimum deployment time multiplier value is again incremented. When the minimum deployment time multiplier value is incremented to a value of 3 for SLO A, the maximum percentage of the error budget remaining (i.e., 22.22%) is greater than or equal to 12.5%, so the minimum deployment time multiplier value retains a value of 3. As such, for SLO A the returned minimum deployment time would equal the product of the minimum deployment time and the minimum deployment time multiplier value.

Figure 10A:
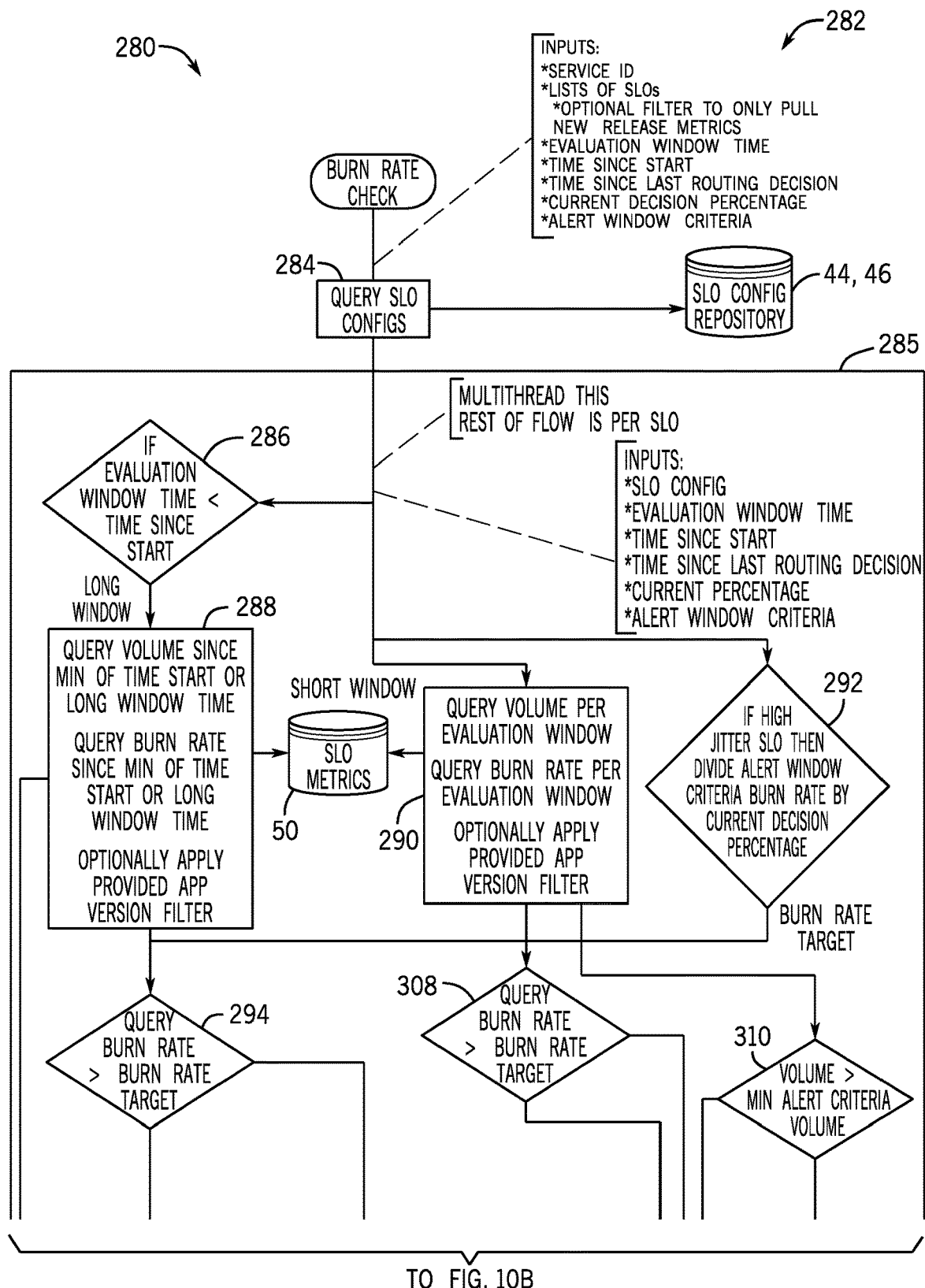
FIGS. 10A and 10B illustrate a flow diagram illustrating an embodiment of a burn-rate check process that is performed by a burn-rates endpoint of the CICD API to calculate the multi-window burn rates with respect to the relevant SLOs during a Canary deployment, and to make routing decisions for the Canary deployment based on these burn rates, in accordance embodiments of the present technique.
Figure 10B:
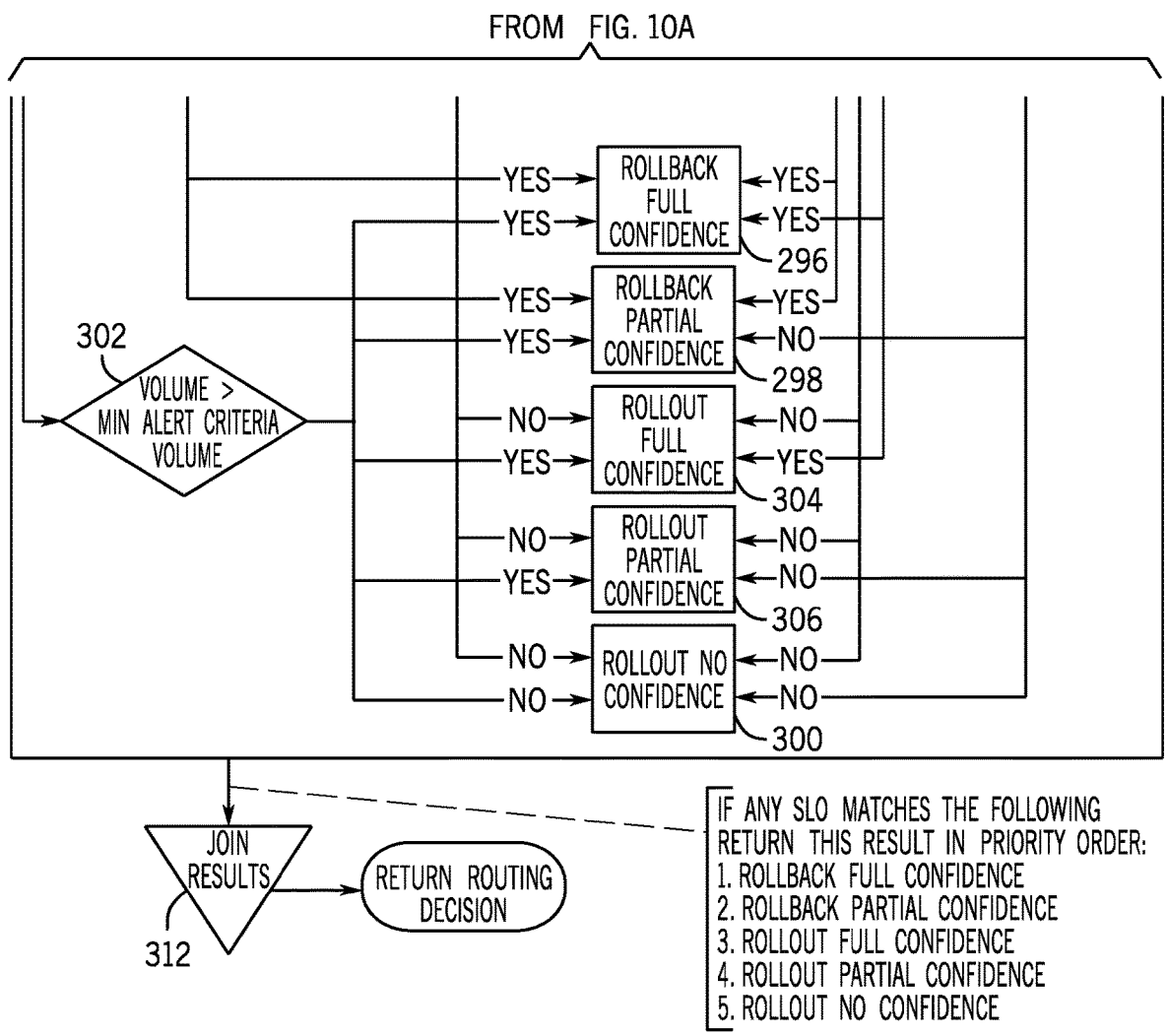

FIGS. 10A and 10B illustrate a flow diagram illustrating an embodiment of a burn-rate check process 280 that is performed by the burn-rates endpoint 54B of the CICD API 52 to calculate the multi-window burn rates with respect to the relevant SLOs during a Canary deployment, and to make routing decisions for the Canary deployment based on these burn rates. The burn-rates endpoint 54B receives certain information as inputs 282 in order to calculate the burn rates and make the routing decisions, wherein these inputs 282 may be retrieved from configurations 36 of the software deployment platform 32, received as parameters when the burn-rates endpoint 54B is called, or any combination thereof. For the embodiment illustrated in FIGS. 10A and 10B, the inputs 282 include the service identifier (ID) associated with the new version of the application being deployed, a set of relevant SLOs to be considered, respective short and long evaluation time windows for each of the relevant SLOs, an amount of time that has passed since the Canary deployment was initiated, an amount of time that has passed since the previous routing action, a percentage of traffic that will be routed based on the next routing action, and the multi-window alert criteria for each of the relevant SLOs (as discussed above with respect to Table 1). In certain embodiments, the inputs 282 may also include an optional filter to only retrieve metrics related to the new version of the application being deployed. The process 280 begins with the burn-rates endpoint 54B querying (block 284) the configurations of the SLOs 46 in the SLO repository 44 to determine configuration information for the SLOs that are relevant to the new version of the application being deployed. Subsequently, the burn-rates endpoint 54B spawns a separate thread that independently performs a set of steps, represented by the block 285, for each of the relevant SLOs.

For the embodiment illustrated in FIGS. 10A and 10B, for each relevant SLO, the process 280 includes the burn-rates endpoint 54B determining (decision block 286) whether the evaluation time window is less than the time since the Canary deployment was initiated, in which case there should be sufficient data in the SLO metrics 50 to perform a long burn rate window evaluation. When it is, the burn-rates endpoint 54B responds by querying (block 288) the SLO metrics 50 to determine: the traffic volume being routed to the new version and the old version of the application, as well as the long window burn rate of the SLO, since the lesser of either the amount of time that has elapsed since the initiation of the Canary deployment or the duration of the long evaluation time window. The process 280 also includes the burn-rates endpoint 54B querying (block 290) the SLO metrics 50 to determine the traffic volume routed to the previous version and the new version of the application, and performing a short burn rate window evaluation to determine the short window burn rate of the SLO per the short evaluation time window. In some embodiments, in blocks 288 and/or 290, an application version filter may also be applied to these queries, for example, to limit the short and/or long SLO burn rate evaluations to only the new version of the application being deployed.

For the embodiment illustrated in FIGS. 10A and 10B, for each relevant SLO, the process 280 includes block 292, wherein, when the burn-rates endpoint 54B determines that the SLO is indicated as a high-jitter SLO in its configuration (e.g., via a high-jitter flag), then the burn-rates endpoint 54B responds by setting a burn rate target to be a burn rate defined in the alert window criteria (e.g., the high-priority alert burn rate) divided by the percentage of traffic that will be routed by the next routing action. This is to inversely increase the burn rate for SLOs with a high amount of variance, but that generally smooth out the variance at sufficient traffic volume. For example, if the high-priority alert burn rate defined by the alert window criteria has a value of 14.4 and the percentage of traffic that will be routed based on the current routing decision is 12.5%, then the burn rate target value in the first routing decision is 115.2, the burn rate target value in the second routing decision is 57.6, the burn rate target value in the third routing decision is 38.4, the burn rate target value in the fourth routing decision is 28.8, the burn rate target value in the fifth routing decision is 23.0, the burn rate target value in the sixth routing decision is 19.2, the burn rate target value in the seventh routing decision is 16.5, and the burn rate target value in the final routing decision is 14.4. For non-high-jitter SLOs, the burn rate target corresponds to a burn rate defined in the alert window criteria (e.g., the high-priority alert burn rate).

For the embodiment illustrated in FIGS. 10A and 10B, for each relevant SLO, the process 280 continues with the burn-rates endpoint 54B executing a number of decision blocks based on the outputs of blocks 288 (when performed), 290, and 292, in order to determine a routing decision (e.g., rollout or rollback) and a confidence in this decision (e.g., full confidence, partial confidence, no confidence) with respect to the SLO. The decision blocks include decision block 294 that, in response to determining that the long window burn rate determined in block 288 is greater than the burn rate target of block 292, signals for a full confidence rollback 296, a partial confidence rollback 298, a full confidence rollout 304, and a partial confidence rollout 306, and otherwise signals for a no confidence rollout 300. The decision blocks include decision block 302 that, in response to determining that the traffic volume queried in block 288 is greater than the minimum alert criteria volume of the SLO, signals for the full confidence rollback 296, the partial confidence rollback 298, the full confidence rollout 304, and the partial confidence rollout 306, and otherwise signals for the no confidence rollout 300. The decision blocks also include decision block 308 that, in response to determining that the short window burn rate determined in block 290 is greater than the burn rate target of block 292, signals for the full confidence rollback 296 and the partial confidence rollback 298, and otherwise signals for the full confidence rollout 304, the partial confidence rollout 306, and the no confidence rollout 300. The decision blocks also include decision block 310 that, in response to determining that the traffic volume queried in block 290 is greater than the minimum alert criteria volume of the SLO, signals for the full confidence rollback 296 and the full confidence rollout 304, and otherwise signals for the partial confidence rollback 298, the partial confidence rollout 306, and the no confidence rollout 300.

Based on the signals output by the decision blocks 294, 302, 308, and 310, the burn-rates endpoint 54B selects a final routing decision (e.g., rollout or rollback) and a confidence in this decision (e.g., full confidence, partial confidence, no confidence) based on the SLO under evaluation. For example, each of the routing decision/confidence value combinations may be assigned a priority, such that, when different routing decision/confidence value combinations are signaled by at least one of the decision blocks 294, 302, 308, and 310, certain combinations take precedent over others. In an embodiment, the priority may include the full confidence rollback 296 as the highest priority, followed by the partial confidence rollback 298, followed by the full confidence rollout 304, followed by the partial confidence rollout 306, followed by the no confidence rollout 300. At block 312, the respective routing decisions and confidences for each of the relevant SLOs determined by each of threads are combined to render and overall routing decision and confidence. In certain embodiments, the priority described above may also be applied when combining the respective routing decisions and confidences returned by each of the threads for the relevant SLOs.

SLO-Based Chaos Engineering

As noted above with respect to FIGS. 1 and 2, in certain embodiments, the CICD API 52 of the SLO-based CICD framework 10 includes the chaos-budgets endpoint 54C that enables SLO-based chaos engineering and chaos testing of applications. The chaos-budgets endpoint 54C returns a set of chaos rates, wherein each chaos rate indicates a failure rate needed for an application or service to exhaust a remaining error budget over an SLO time window (e.g., 30 days for a 30-day SLO) for a given SLO. As discussed below, the set of chaos rates may be used to define an upper bound for chaos injection during chaos testing of the application or service.

The chaos rates returned by the chaos-budgets endpoint 54C are constrained by current burn rates and burn rate thresholds of each SLO to avoid excessive impact to clients. In some embodiments, an additional maximum failure rate constraint can be provided to limit the allowed chaos failure rate that is returned for a given SLO. Theoretically, if there is a 100% success rate and a burn rate of 1 is selected, the returned failure rate will be sufficient to exhaust the entire error budget of a 30-day SLO in 30 days. However, a burn rate less than 1 is generally used to allow for unexpected blips in the error budget and/or the normal burn rate. The CICD API 52 is designed with this in mind, and as such, it will subtract the normal burn rate and only return chaos rates that indicate the additional failure rate needed to meet the maximum burn rate target of each of the SLOs.

Figure 11A:
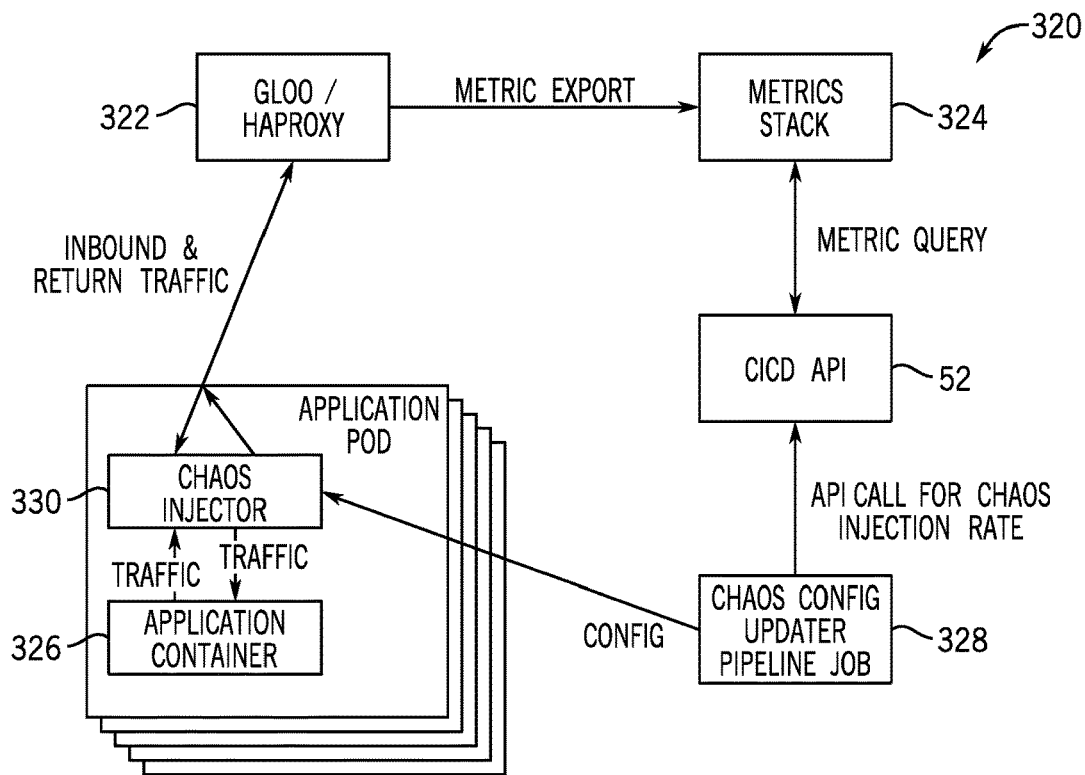
FIG. 11A is a diagram illustrating an embodiment in which chaos testing of an application is performed by the SLO-based CICD framework using an ad-hoc pipeline or scheduled pipeline, in accordance embodiments of the present technique.

With the foregoing in mind, FIG. 11A is a diagram 320 illustrating an embodiment in which chaos testing of an application is performed by the SLO-based CICD framework 10 using an ad-hoc pipeline or scheduled pipeline with Envoy, which is an open-source edge and service proxy. For the illustrated example, the SLO-based CICD framework 10 includes one or more routing services 322, such as Gloo (an open source gateway) and/or HAProxy (an open source load balancer and proxy), that suitably route incoming traffic to instances of the application, which executes within the application container 326. During operation, the routing services 322 export metrics to the SLO metrics 50 of the time-series database 48, labeled as metric stack 324 in FIG. 11A.

For the embodiment illustrated in FIG. 11A, a chaos configuration updater pipeline job 328 calls the chaos-budgets endpoint 54C of the CICD API 52 to determine, based on a set of SLOs and their corresponding metrics, a set of chaos rates for chaos testing of the application. The returned set of chaos rates takes into account the current multi-window burn rates of the SLOs, while the corresponding burn rate threshold of each SLO is considered to avoid excessive impact to clients during chaos testing. Based on the returned set of chaos rates, the chaos configuration updater pipeline job 328 updates the configuration of a chaos injector 330 (e.g. an Envoy sidecar chaos injector), logically disposed between the routing service 322 and the application container 326, to inject faults for chaos testing. Based on the configuration, the chaos injector 330 utilizes a HTTP fault injection plugin to inject faults on inbound calls to the application. It may be appreciated that, for the embodiment of FIG. 11A, certain legitimate failures and certain injected failures may overlap, which can lead to a slightly lower actual overall failure rate. Additionally, for certain embodiments that use Envoy, the Envoy sidecar chaos injector 330 can be configured analyze headers in order to target inbound calls to the application from certain client devices for injection. It may also be appreciated that, since the chaos-budgets endpoint 54C returns the set of chaos rates in terms of a continuous injection allowance, the returned chaos rates may be increased (e.g., spiked) to a higher value for the embodiment illustrated in FIG. 11A.

Figure 11B:
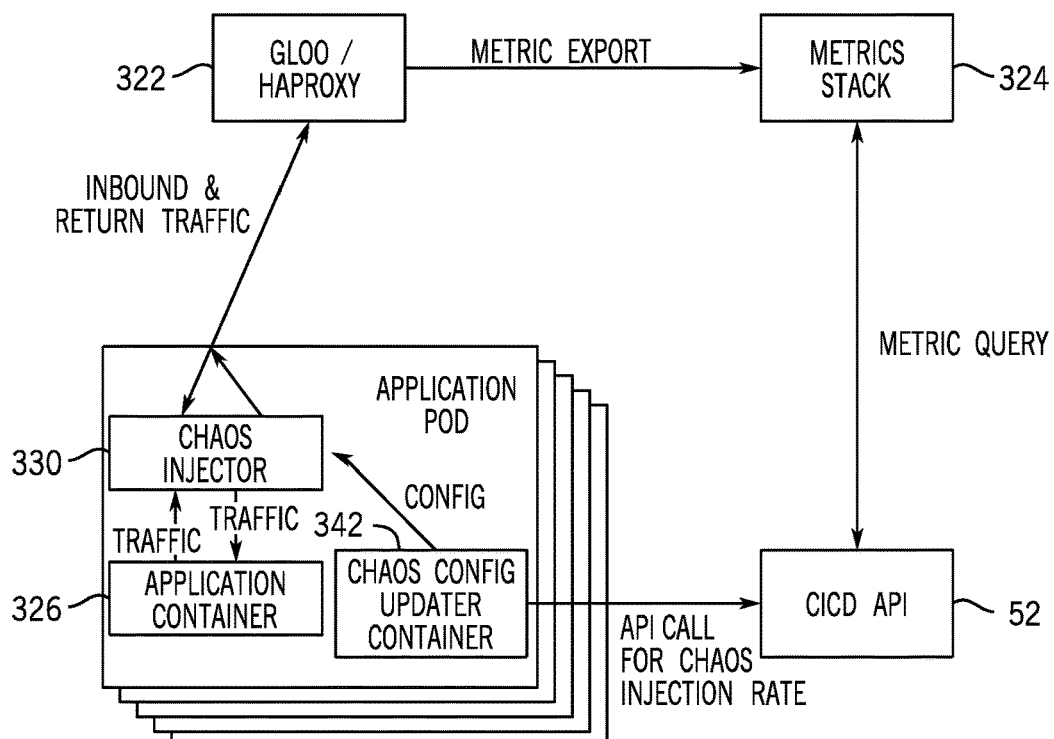
FIG. 11B is a diagram illustrating an embodiment in which chaos testing of an application is performed by the SLO-based CICD framework using continuous random injection, in accordance embodiments of the present technique.

FIG. 11B is a diagram 340 illustrating an embodiment in which chaos testing of an application is performed by the SLO-based CICD framework 10 using continuous random injection. In contrast to the embodiment of FIG. 11A, the embodiment of FIG. 11B includes a chaos configuration updater 342, which may be implemented using a second Envoy sidecar in certain embodiments. The chaos configuration updater 342 regularly calls the chaos-budgets endpoint 54C of the CICD API 52 to determine, based on a set of SLOs and their corresponding metrics, a set of chaos rates for chaos testing of the application. The chaos configuration updater 342 further continuously adjusts the configuration of the chaos injector 330 (e.g., an Envoy sidecar chaos injector) to control the failure rate injected into in-bound calls to the application as part of chaos testing, such that the entire error budgets of the SLOs are not completely depleted. In certain embodiments, the chaos configuration updater 342 may randomly sleep for a predefined number of cycles, and then multiply the chaos rates returned by the chaos-budgets endpoint 54C by a predefined value to determine the number of failures to be injected. It may be appreciated that this approach increases (e.g., spikes) the failure rate to simulate blips to the clients, which provides a way to validate that the clients can handle spikes in the failure rate. Additionally, in certain embodiments, the injected failures could be targeted to specific API keys or clients, wherein the chaos injector 330 can cycle through these clients intermittently as part of an automated validation method. It is presently recognized that it is not beneficial to merely continually introduce failures without validating some specific hypothesis, which is why random injection is much more effective for chaos testing.

In an example embodiment, the chaos configuration updater pipeline job 328 of FIG. 11A (or the chaos configuration updater 342 of FIG. 11B) may perform a number of steps or action to determine suitable failure rates for chaos testing and to update the configuration of the chaos injector 330 accordingly. For example, in certain embodiments, the chaos configuration updater pipeline job 328 receives a number of inputs, including a service identifier (ID) of the application to undergo chaos testing, a set of SLOs to be considered during chaos testing, and an evaluation cycle window. Each of the SLOs in the set may include an identity or name of the SLO, a URI route paths list that is monitored by the SLO metrics 50, and an optional list of client API keys to target for failure injection. Additionally, the chaos configuration updater pipeline job 328 may initialize a respective chaos rate for each SLO to a value of zero.

Continuing through the example embodiment, the chaos configuration updater pipeline job 328 then calls the chaos-budgets endpoint 54C of the CICD API 52, providing the set of SLOs and their corresponding current chaos rates as input, and receiving an updated chaos rate for each of the SLOs in response. For embodiments in which injected failures are targeted to in-bound calls from particular clients by client API keys, these steps may also include the chaos configuration updater pipeline job 328 iterating through a list of client API keys to select a particular client to target with the failure injections. The chaos configuration updater pipeline job 328 then updates the configuration of the chaos injector 330 to include the URI route paths list, the chaos rate returned by the chaos-budgets endpoint 54C with respect to each SLO, and optionally the client API keys, to use to target the failure injection. In certain embodiments, the chaos configuration updater pipeline job 328 may sleep for a random number of cycles before repeating the process.

Figure 12:
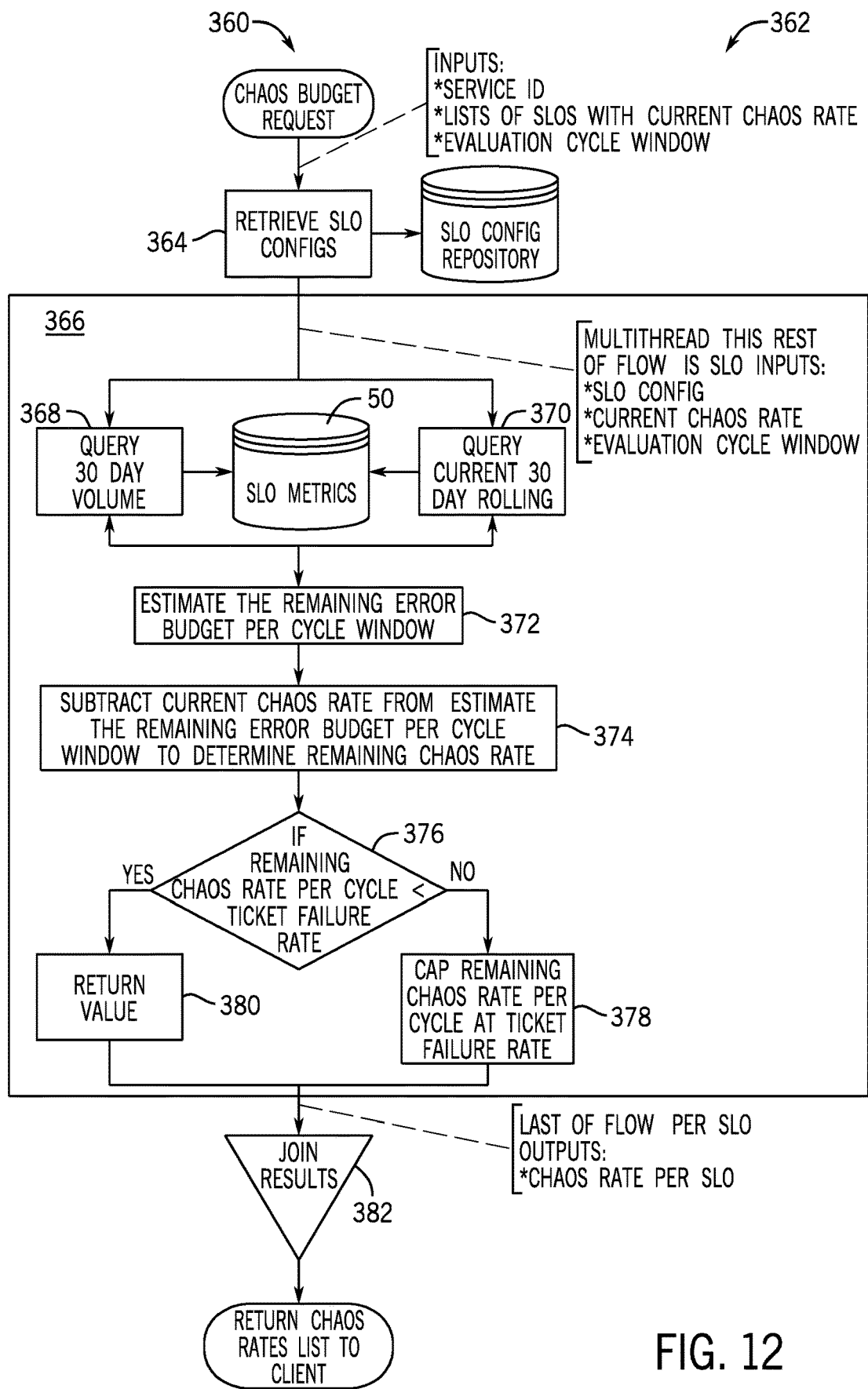
FIG. 12 is a flow diagram illustrating an embodiment of a process performed by a chaos-budgets endpoint of the CICD API to determine respective failure rates needed for an application or service to exhaust a remaining error budget over 30-days for a given set of SLOs, in accordance embodiments of the present technique.

FIG. 12 is a flow diagram illustrating an embodiment of a process 360 performed by the chaos-budgets endpoint 54C of the CICD API 52 to determine the set of chaos rates for chaos testing of an application or service based on a provided set of 30-day SLOs. As noted above, for a 30-day SLO, each chaos rate represents a failure rate that would result in the application or service exhausting a remaining error budget associated with the SLO over 30 days. It may be appreciated that, while 30-day SLOs are provided as an example, in other embodiments, SLOs having different corresponding SLO time windows (e.g., 45-day SLOs, 60-day SLOs, 90-day SLOs) may be used, and the SLO metrics for these SLOs may be queried and evaluated, as discussed below, using the corresponding SLO time window of each SLO. The chaos-budgets endpoint 54C receives certain information as inputs 362 in order to calculate these chaos rates, wherein these inputs 362 may be retrieved from configurations 36 of the software deployment platform 32, received as parameters when the chaos-budgets endpoint 54C is called, or any combination thereof. For the embodiment illustrated in FIG. 12, the inputs 362 include the service identifier (ID) associated with the application or service undergoing chaos testing, the set of SLOs to be considered and their corresponding current chaos rates, and an evaluation cycle window. As noted above, the chaos rates associated with each of the SLOs may be initialized to zero prior to an initial call to the chaos-budgets endpoint 54C, and these initialized chaos rates may be updated by each execution of the chaos-budgets endpoint 54C. The process 360 begins with the chaos-budgets endpoint 54C querying (block 364) the configurations of the SLOs 46 in the SLO repository 44 to retrieve configuration information for each of the SLOs that are included in the input set of SLOs.

For the embodiment illustrated in FIG. 12, the chaos-budgets endpoint 54C subsequently spawns a separate thread that independently performs a set of steps, represented by the block 366, for each of the SLOs of the input set. These steps include the chaos-budgets endpoint 54C determining the current burn rate with respect to the SLO. To do so, the chaos-budgets endpoint 54C queries (block 368) the SLO metrics 50 to determine a 30-day volume for the SLO, and queries (block 370) the SLO metrics 50 to determine a current 30-day rolling failure rate for the SLO. Using the retrieved SLO metrics, the process 360 estimates (block 372) the remaining error budget of the SLO per the evaluation cycle window provided as part of the inputs 362. The chaos-budgets endpoint 54C then determines (block 374) a remaining chaos rate of the SLO per evaluation cycle window by subtracting the current chaos rate of the SLO from the estimated remaining error budget of the SLO per evaluation cycle window, as determined in block 372. It may be appreciated that, for an initial execution of the chaos-budgets endpoint 54C, since the current chaos rate of the SLO is initialized to zero, then the remaining error budget determined in block 372 may be used for the later steps in place of the remaining chaos rate.

For the embodiment illustrated in FIG. 12, the chaos-budgets endpoint 54C then determines (decision block 376) whether the remaining chaos rate of the SLO per evaluation cycle is less than a burn rate associated with a low-priority alert (e.g., a ticket event), as defined by the alert criteria of the SLO. When it is not, the chaos-budgets endpoint 54C responds by capping (block 378) the remaining chaos rate of the SLO per evaluation cycle at the burn rate of the low-priority alert. Otherwise, when chaos-budgets endpoint 54C determines (decision block 376) that the remaining chaos rate of the SLO per evaluation cycle is less than the burn rate associated with a low-priority alert, the chaos-budgets endpoint 54C responds by returning (block 380) the remaining chaos rate of the SLO. At block 382, the chaos-budgets endpoint 54C combines the remaining chaos rates for each of the SLOs into a set of chaos rates that is returned and used as set forth above.

SLO-Based Performance Testing

Figure 13:
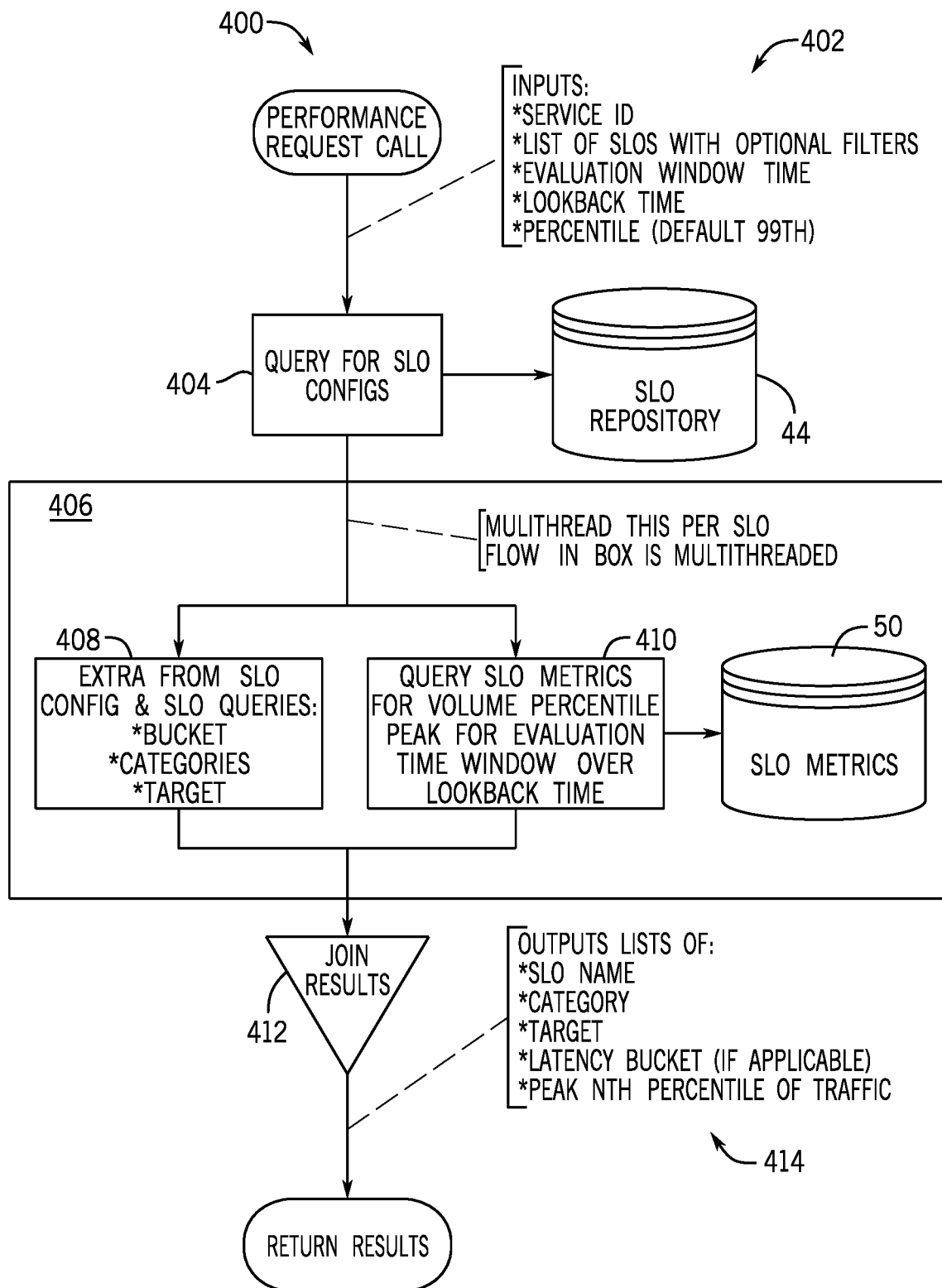
FIG. 13 is a flow diagram illustrating an embodiment of a process performed by a peak-volumes endpoint of the CICD API to determine peak volumes of traffic in production and to return the SLO configuration (e.g., latency buckets, targets) for use in performance testing of an application, in accordance embodiments of the present technique.

FIG. 13 is a flow diagram illustrating an embodiment of a process 400 performed by the peak-volumes endpoint 54D of the CICD API 52 to determine peak traffic volumes of an application or service in production, and to return a set of performance testing SLO configurations (e.g., latency buckets, targets) for use in performance testing of the application or service. The peak-volumes endpoint 54D receives certain information as inputs 402 in order to determine these outputs, wherein these inputs may be retrieved from configurations 36 of the software deployment platform 32, received as parameters when the peak-volumes endpoint 54D is called, or any combination thereof. For the embodiment illustrated in FIG. 13, the inputs include the service identifier (ID) associated with the application or service to be performance tested, a set or list of SLOs related to a performance variable (with optional filters), an evaluation time window, and a lookback time period. In some embodiments, the inputs 402 include a quantile or percentile value, while the percentile value may be set to a default value (e.g., 99%) when the percentile value is not provided as part of the inputs.

For the embodiment illustrated in FIG. 13, the process 400 begins with the peak-volumes endpoint 54D querying (block 404) the configurations of the SLOs in the SLO repository 44 to determine configuration information for the SLOs that are included in the set of SLO received as part of the inputs 402. The peak-volumes endpoint 54D subsequently spawns a separate thread that independently performs a set of steps, represented by the block 406, for each of the SLOs. These steps include the peak-volumes endpoint 54D extracting (block 408) from the queried configurations of the SLOs, respective bucket values (for latency SLOs), a respective category value, and a respective target value. Additionally, these steps include the peak-volumes endpoint 54D querying (block 410) the SLO metrics 50 of the time-series database 48 to determine peak nth percentile (e.g., 99%) of the traffic volume for the evaluation window time over the lookback time period, as indicated by the inputs 402. For the embodiment illustrated in FIG. 13, once the blocks 408 and 410 have been independently performed for each of the SLOs of the set, the peak-volumes endpoint 54D combines (block 412) the extracted and queried information for each of the SLOs into an output list 414 of performance testing SLO configurations for use in performance testing of the application. For the illustrated embodiment, the output list 414 includes the names of each of the SLOs, the category of each of the SLOs, the target value of each of the SLOs, the latency bucket values (when applicable) of each of the SLOs, and the peak nth percentile of the traffic volume of each of the SLOs per interval time.

Figure 14:
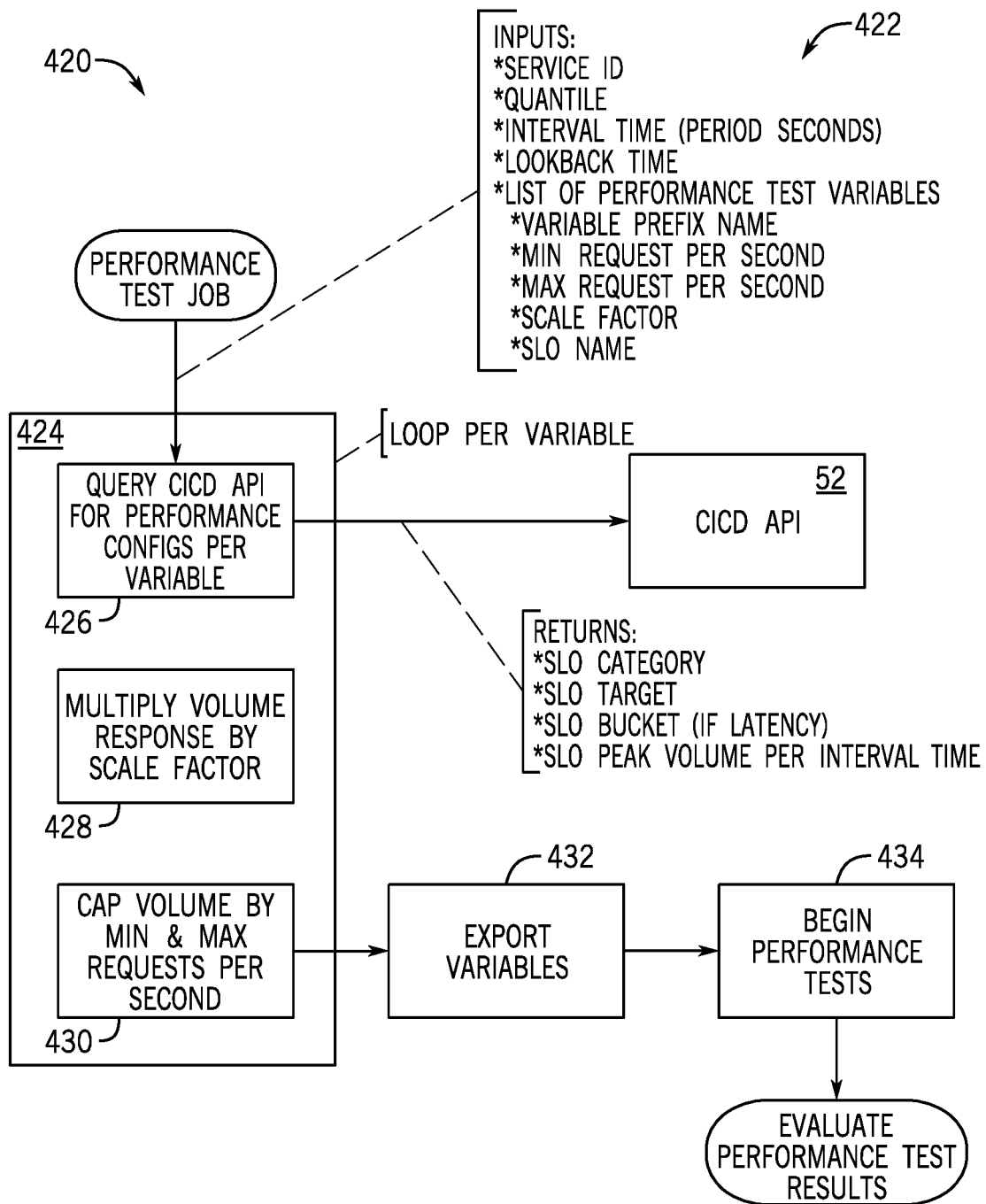
FIG. 14 is a flow diagram illustrating an embodiment of a process that is performed by a pipeline job of the software development platform to conduct performance testing of an application, in accordance embodiments of the present technique.

FIG. 14 is a flow diagram illustrating an embodiment of a process 420 that is performed by a pipeline job of the software development platform 38 to conduct performance testing of an application. In certain embodiments, the process 420 may be implemented using a software performance testing application, such as Taurus or JMeter, which are open source applications for test automation, and can simulate actual production traffic volumes. In certain embodiments, the process 420 supports both minimum and maximum thresholds to account for deviations in production traffic volume. The process 420 receives certain information as inputs 422 in order to conduct performance testing, wherein these inputs may be retrieved from configurations 36 of the software deployment platform 32, received as parameters when the pipeline job is called, or any combination thereof. For the embodiment illustrated in FIG. 14, the inputs 422 include the service identifier (ID) associated with the application or service to be performance tested, a quantile value, an interval time period (e.g., in seconds), a lookback time period, and a set of performance test variables. The set of performance test variables includes a variable prefix name of each performance test variable, a minimum and maximum number of requests per second for each performance test variable, a scale factor for each performance test variable, and the name of a SLO associated with the each performance test variable.

For the embodiment illustrated in FIG. 14, the process 420 includes a set of actions or steps, indicated by block 424, that are performed by the pipeline job for each of the performance test variables of the set of performance test variables received as part of the inputs 422. These steps include calling and executing (block 426) the peak-volumes endpoint 54D of the CICD API 52, as discussed in FIG. 13, to determine performance testing SLO configurations for each of the SLOs associated with the current performance test variable, including the category of each SLO, the target value of each SLO, the SLO bucket of each SLO (when the SLO relates to latency), and the peak nth percentile of the traffic volume of each of the SLOs per the interval time. As such, when calling the peak-volumes endpoint 54D, the interval time period of the inputs 422 may be provided as the evaluation time window, and the quantile value of the inputs 422 may be provided as the percentile value. The steps also include multiplying (block 428) the peak nth percentile of the traffic volume of each of the SLOs per the interval time by the respective scale factor of the current performance test variable. The steps further include capping (block 430) the peak nth percentile of the traffic volume of each of the SLOs per the interval time based on the respective minimum and maximum requests per second of the current performance test variable. After looping through all of the performance test variables of the set in block 424, the process 420 continues with the pipeline job exporting the performance test variables (block 432) before beginning the performance tests (block 434) of the application using the exported variables. As illustrated, the process 420 concludes with the pipeline job returning the results of the performance testing.

The technical effects of the present technique include a Service Level Objective (SLO)-based Continuous Integration/Continuous Development (CICD) framework, which enables SLO-based Canary deployments, SLO-based chaos engineering, and/or SLO-based performance testing. The SLO-based CICD framework enhances and simplifies CICD pipelines and brings the pipelines in line with Site Reliability Engineering (SRE) best practices. By relying on SLOs rather than SLIs, the SLO-based CICD framework avoids the use of threshold-based alerts, which can be noisy and error prone, and the thresholds associated with threshold-based alerts can change over time due to changes in production volume. The SLO-based CICD framework uses multi-window burn rates when evaluating SLOs, which removes the reliance on a static, predefined thresholds of SLI threshold-based alerting, and removes sensitivity of such evaluations to changes in production volume. With respect to SLO-based Canary deployments, the SLO-based CICD framework reduces IT costs and developer efforts by avoiding the manual toil generally associated with Canary deployments. To effectively manage risk levels, the SLO-based CICD framework enables applications or services to be blocked from release or deployment when an error budget for the application or service has been breached. With respect to SLO-based chaos engineering, the SLO-based CICD framework enables dynamic calculation of the fault injection tolerance based, at least in part, on the current non-chaos failures and a SLO-based burn rate upper bound. It may be appreciated that this enables controlled chaos testing of production failure cases to enhance resiliency without exceeding the allowed error budget, ensuring SLO compliance and client satisfaction. The SLO-based CICD framework also varies chaos fault injection based on current volume to ensure that the application or service being tested will be able to handle changes in volumes over time. With respect to SLO-based performance testing, the SLO-based CICD framework retrieves SLO targets and SLI definitions, and performance tests are updated by the CICD application programming interface (API) based on the business definitions. As such, this SLO-based performance testing enables issues in applications or services to be identified and corrected before being deployed into a production environment.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:
at least one memory configured to store a Service Level Objective (SLO)-based Continuous Integration/Continuous Development (CICD) framework having a CICD application programming interface (API); and
at least one processor configured to execute stored instructions to cause the SLO-based CICD framework to perform actions comprising:
receiving inputs comprising a set of performance test variables, wherein each performance test variable of the set of performance test variables comprises a respective set of associated SLOs;
determining an updated set of performance test variables by:
executing, for each performance test variable of the set of the performance test variables, an endpoint of the CICD API to determine performance testing configurations for the respective set of associated SLOs of the performance test variable, including a respective peak traffic volume for each SLO of the respective set of associated SLOs, and
updating, for each performance test variable of the set of the performance test variables, the performance testing configurations of the respective set of associated SLOs of the performance test variable based on one or more parameters of the performance test variable, the one or more parameters comprising a respective minimum number of requests per second, a respective maximum number of requests per second, and a respective scale factor, by:
multiplying, for each SLO of the respective set of associated SLOs, the respective peak traffic volume of the SLO by the respective scale factor of the performance tests variable, and
capping, for each SLO of the respective set of associated SLOs, the respective peak traffic volume of the SLO in accordance with the respective minimum number of requests per second of the performance test variable and the respective maximum number of requests per second of the performance test variable; and
performing performance testing of an application using the updated set of the performance test variables, and returning results of the performance testing.

2. The computing system of claim 1, wherein the inputs comprise an interval time period and a lookback time period.

3. The computing system of claim 2, wherein the performance testing configurations comprise a respective category and a respective target value for each SLO of the respective set of associated SLOs.

4. The computing system of claim 3, wherein, to execute the endpoint of the CICD API to determine the performance testing configurations for the respective set of associated SLOs of the performance test variable, the at least one processor is configured to execute the stored instructions to cause the SLO-based CICD framework to perform actions comprising:

retrieving configurations for each of the respective set of associated SLOs; and for each SLO of the respective set of associated SLOs:

extracting the respective category of the SLO and the respective target value of the SLO from the retrieved configurations, and querying SLO metrics collected for the SLO and the application to determine the respective peak traffic volume for the SLO per the interval time period over the lookback time period; and combining the respective category, the respective target value, and the respective peak traffic volume of each SLO of the respective set of associated SLOs to yield the performance testing configurations.

5. The computing system of claim 4, wherein the performance testing configurations comprise respective latency bucket values for each latency SLO of the respective set of associated SLOs of the performance test variable, and wherein the respective latency bucket values of each latency SLO are extracted from the retrieved configurations.

6. The computing system of claim 1, wherein the respective set of associated SLOs of each performance variable comprises an availability SLO, a latency SLO, a computing resource usage SLO, or any combination thereof.

7. A method of operating a Service Level Objective (SLO)-based Continuous Integration/Continuous Development (CICD) framework having a CICD application programming interface (API), the method comprising:

receiving inputs comprising a set of performance test variables, wherein each performance test variable of the set of performance test variables comprises a respective set of associated SLOs;

determining an updated set of performance test variables by:

executing, for each performance test variable of the set of the performance test variables, an endpoint of the CICD API to determine performance testing configurations for the respective set of associated SLOs of the performance test variable, including a respective peak traffic volume for each SLO of the respective set of associated SLOs, and updating, for each performance test variable of the set of the performance test variables, the performance testing configurations of the respective set of associated SLOs of the performance test variable based on one or more parameters of the performance test variable, the one or more parameters comprising a respective minimum number of requests per second, a respective maximum number of requests per second, and a respective scale factor, by:

multiplying, for each SLO of the respective set of associated SLOs, the respective peak traffic volume of the SLO by the respective scale factor of the performance test variable, and capping, for each SLO of the respective set of associated SLOs, the respective peak traffic volume of the SLO in accordance with the respective minimum number of requests per second of the performance test variable and the respective maximum number of requests per second of the performance test variable; and performing performance testing of an application using the updated set of the performance test variables, and returning results of the performance testing.

8. The method of claim 7, wherein the inputs comprise an interval time period and a lookback time period.

9. The method of claim 8, wherein the performance testing configurations comprise a respective category and a respective target value for each SLO of the respective set of associated SLOs.

10. The method of claim 9, wherein executing the endpoint of the CICD API to determine the performance testing configurations for the respective set of associated SLOs of the performance test variable comprises:

retrieving configurations for each of the respective set of associated SLOs; and for each SLO of the respective set of associated SLOs:

extracting the respective category of the SLO and the respective target value of the SLO from the retrieved configurations, and querying SLO metrics collected for the SLO and the application to determine the respective peak traffic volume for the SLO per the interval time period over the lookback time period; and combining the respective category, the respective target value, and the respective peak traffic volume of each SLO of the respective set of associated SLOs to yield the performance testing configurations.

11. The method of claim 10, wherein the performance testing configurations comprise respective latency bucket values for each latency SLO of the respective set of associated SLOs of the performance test variable, and wherein the respective latency bucket values of each latency SLO are extracted from the retrieved configurations.

12. The method of claim 7, wherein the respective set of associated SLOs of each performance variable comprises an availability SLO, a latency SLO, a computing resource usage SLO, or any combination thereof.

13. A non-transitory, computer-readable medium storing instructions executable by a processor of a computing system to provide a Service Level Objective (SLO)-based Continuous Integration/Continuous Development (CICD) framework having a CICD application programming interface (API), the instructions comprising instructions to:

receive inputs comprising a set of performance test variables, an interval time period, and a lookback time period, wherein each performance test variable of the set of performance test variables comprises a respective set of associated SLOs;

determining an updated set of performance test variables by:

executing, for each performance test variable of the set of the performance test variables, an endpoint of the CICD API to determine performance testing configurations for the respective set of associated SLOs of the performance test variable, the performance testing configurations comprising a respective category and a respective target value for each SLO of the respective set of associated SLOs, including a respective peak traffic volume for each SLO of the respective set of associated SLOs, by:

retrieving configurations for each SLO of the respective set of associated SLOs, extracting, for each SLO of the respective set of associated SLOs, the respective category of the SLO and the respective target value of the SLO from the retrieved configurations, querying, for each SLO of the respective set of associated SLOs, SLO metrics collected for the SLO and the application to determine the respective peak traffic volume for the SLO per the interval time period over the lookback time period, and combining, for each SLO of the respective set of associated SLOs, the respective category, the respective target value, and the respective peak traffic volume to yield the performance testing configurations, and updating, for each performance tests variable of the set of the performance test variables, the performance testing configurations of the respective set of associated SLOs of the performance test variable based on one or more parameters of the performance test variable; and perform performance testing of an application using the updated set of the performance test variables, and return results of the performance testing.

14. The medium of claim 13, wherein the parameters of each performance test variable of the set of performance test variables comprise a respective minimum number of requests per second, a respective maximum number of requests per second, and a respective scale factor, and wherein the instructions to update the performance testing configurations of the respective set of associated SLOs of the performance test variable comprise instructions to:

for each SLO of the respective set of associated SLOs:

multiply the respective peak traffic volume of the SLO by the respective scale factor of the performance test variable, and cap the respective peak traffic volume of the SLO in accordance with the respective minimum number of requests per second of the performance test variable and the respective maximum number of requests per second of the performance test variable.

15. The medium of claim 13, wherein the performance testing configurations comprise respective latency bucket values for each latency SLO of the respective set of associated SLOs of the performance test variable, and wherein the instructions comprise instructions to extract respective latency bucket values of each latency SLO from the retrieved configurations.

* * * * *